(12) United States Patent
Djukic et al.

(10) Patent No.: US 9,838,272 B2
(45) Date of Patent: Dec. 5, 2017

(54) SERVICE ENHANCEMENT DISCOVERY FOR CONNECTIVITY TRAITS AND VIRTUAL NETWORK FUNCTIONS IN NETWORK SERVICES

(71) Applicant: Ciena Corporation, Hanover, MD (US)

(72) Inventors: Petar Djukic, Ottawa (CA); Todd Morris, Stittsville (CA); David Jordan Krauss, Centreville, VA (US)

(73) Assignee: Ciena Corporation, Hanover, MD (US)

( * ) Notice: Subject to any disclaimer, the term of this patent is extended or adjusted under 35 U.S.C. 154(b) by 269 days.

(21) Appl. No.: 14/684,530

(22) Filed: Apr. 13, 2015

(65) Prior Publication Data

US 2016/0301579 A1    Oct. 13, 2016

(51) Int. Cl.
*H04W 28/12*    (2009.01)
*H04L 12/24*    (2006.01)
*H04L 12/26*    (2006.01)

(52) U.S. Cl.
CPC ...... *H04L 41/5009* (2013.01); *H04L 41/5058* (2013.01); *H04L 41/5051* (2013.01); *H04L 43/08* (2013.01)

(58) Field of Classification Search
CPC .. H04L 41/5009; H04L 63/0272; H04L 12/14
See application file for complete search history.

(56) References Cited

U.S. PATENT DOCUMENTS

| | | |
|---|---|---|
| 2013/0176846 A1 | 7/2013 | Callard et al. |
| 2014/0201374 A1 | 7/2014 | Ashwood-Smith et al. |
| 2014/0229210 A1 | 8/2014 | Sharifian et al. |
| 2014/0229945 A1 | 8/2014 | Barkai et al. |
| 2014/0269767 A1 | 9/2014 | Djukic et al. |
| 2014/0310388 A1 | 10/2014 | Djukic et al. |
| 2015/0043383 A1 | 2/2015 | Farkas et al. |
| 2015/0195745 A1* | 7/2015 | Farmanbar ............ H04W 28/12 370/236 |
| 2016/0094641 A1* | 3/2016 | Rahman .............. H04L 67/1012 718/1 |
| 2016/0182345 A1* | 6/2016 | Herdrich ................ H04L 43/50 709/224 |

* cited by examiner

*Primary Examiner* — Huy D Vu
*Assistant Examiner* — Teisha D Hall
(74) *Attorney, Agent, or Firm* — Clements Bernard Walker PLLC; Christopher L. Bernard; Lawrence A. Baratta, Jr.

(57) ABSTRACT

Systems and methods for service enhancement discovery in a Software Defined Networking (SDN) network include obtaining network measurements for one or more candidate services in the network; utilizing the network measurements to determine one or more service enhancements for the one or more candidate services; determining a cost and a benefit for each of the service enhancements for the one or more candidate services; and providing the service enhancements for the one or more candidate services based on associated cost and associated benefit of each of the service enhancements.

18 Claims, 22 Drawing Sheets

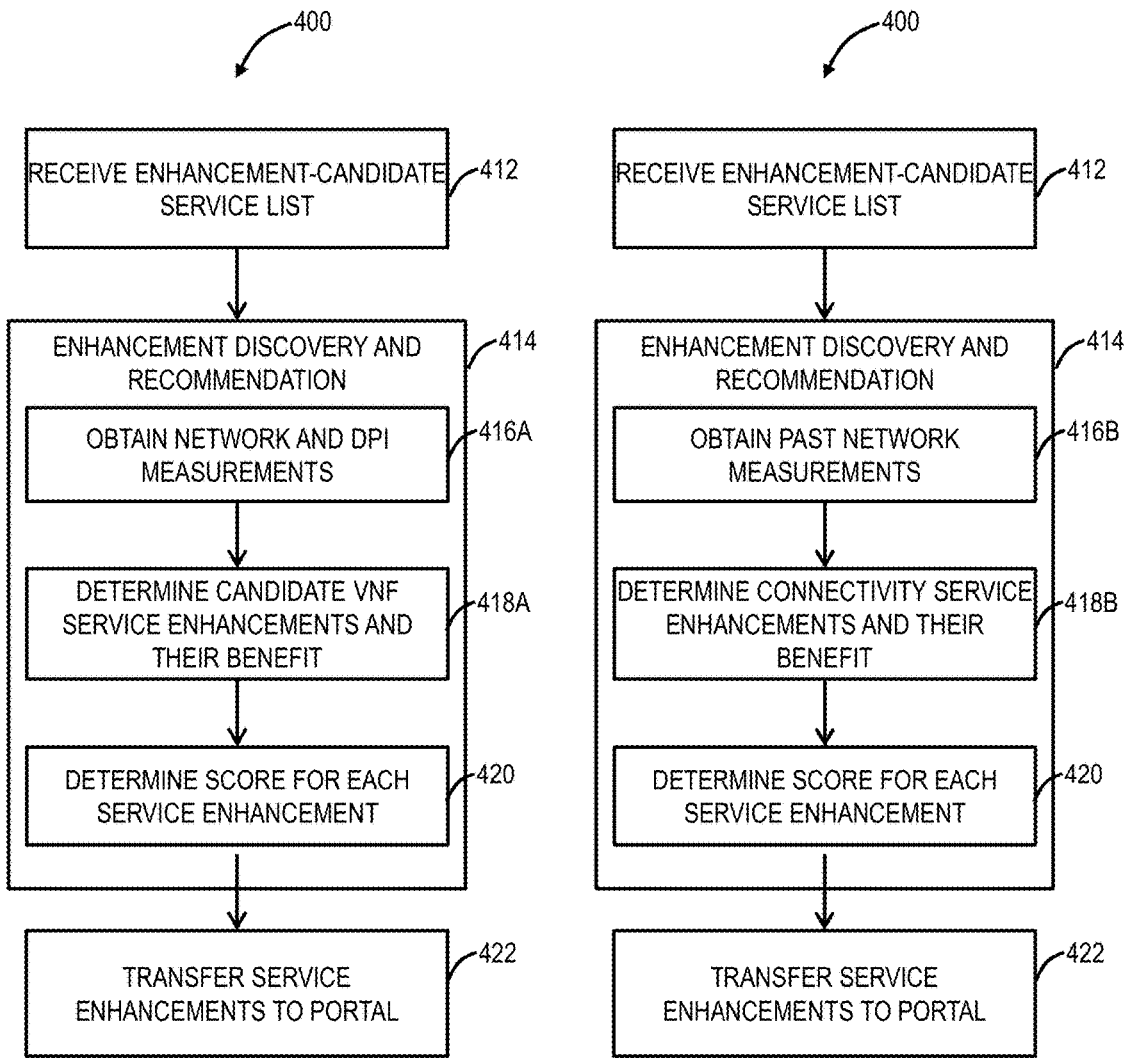

SERVICE ENHANCEMENT DISCOVERY FOR CONNECTIVITY TRAITS AND VIRTUAL NETWORK FUNCTIONS IN NETWORK SERVICES

FIELD OF THE DISCLOSURE

The present disclosure generally relates to networking systems and methods. More particularly, the present disclosure relates to service enhancement discovery for connectivity traits (e.g., bandwidth, priority, etc.) and Virtual Network Functions (VNF) in network services.

BACKGROUND OF THE DISCLOSURE

Software Defined Networking (SDN), Network Functions Virtualization (NFV), and the like offer an opportunity to improve current network management practices with automated optimization processes. SDN provides an architecture that is dynamic, manageable, cost-effective, and adaptable, making it ideal for the high-bandwidth, dynamic nature of applications. This architecture decouples the network control and forwarding functions enabling the network control to become directly programmable and the underlying infrastructure to be abstracted for applications and network services. NFV is a network architecture concept that proposes using Information Technology (IT) virtualization related technologies to virtualize entire classes of network node functions into building blocks that may be connected, or chained, to create communication services. A Virtualized Network Function (VNF) can include one or more virtual machines running different software and processes, on top of industry standard high volume servers, switches, and storage, or even cloud computing infrastructure, instead of having custom hardware appliances for each network function.

Conventional systems and methods, including SDN, NFV, etc., do not have an ability to recommend connectivity service changes and/or VNFs to customers using the network, in an automated manner, using network analytics to make a recommendation on how and when the service can be improved. VNF deployments are currently at an early stage, and each VNF vendor provides targeted VNFs with minimal overlap in functionality with other vendors. Since virtual appliances (VNF) are as complex as their hardware counterparts, they require complex Network Management Systems (NMSs) to provision and monitor their performance. Nevertheless, each NMS only monitors one type of virtual appliance. As NMSs are used to monitor and provision, they do not provide recommendations on how to improve network performance. Even more importantly, an NMS of one vendor would not make a recommendation to use a VNF of another vendor. Thus, conventionally, there is no common system to monitor the performance of network services, especially from the point of view of VNFs that can also recommend which VNFs should be in service.

BRIEF SUMMARY OF THE DISCLOSURE

In an exemplary embodiment, a method for service enhancement discovery in a Software Defined Networking (SDN) network includes obtaining network measurements for one or more candidate services in the network; utilizing the network measurements to determine one or more service enhancements for the one or more candidate services; determining a cost and a benefit for each of the service enhancements for the one or more candidate services; and providing the service enhancements for the one or more candidate services based on associated cost and associated benefit of each of the service enhancements. Determining the service enhancements for an active service can include determining one or more future times at which the active service is enhanced by changing at least one of its bandwidth, path, and packet priority. The service enhancements for an active service can include one or more Virtual Network Functions (VNFs) that enhance the active service. The network measurements can include historical measurements and on-demand measurements, wherein the on-demand measurements are selectively performed on the service enhancements. The cost can be determined based on a cost of adding the service enhancement in the network and the benefit can be determined based on increments to one of Quality of Service (QoS) and Quality of Experience (QoE) for the one or more candidate services. The increments to one of QoS and QoE can be based on one or more of lower required bandwidth, lower packet loss, higher throughput, and faster application response time. The service enhancements for an active service can include one or more Virtual Network Functions (VNFs) which are configured to enhance the active service, and where network measurements can include historical measurements and on-demand measurements, wherein the on-demand measurements are selectively performed with the one or more VNFs on the active service. The one or more VNFs can include a plurality of VNFs with at least two of the plurality of VNFs being different types.

In another exemplary embodiment, a system configured to perform service enhancement discovery in a Software Defined Network (SDN) network includes a network interface communicatively coupled to the network; a processor communicatively coupled to the network interface; and memory storing instructions that, when executed, cause the processor to obtain network measurements from the network for one or more candidate services in the network, utilize the network measurements to determine one or more service enhancements for the one or more candidate services, determine a cost and a benefit for each of the service enhancements for the one or more candidate services, and provide the service enhancements for the one or more candidate services based on associated cost and associated benefit of each of the service enhancements. The service enhancements can be determined for an active service through determining one or more future times at which the active service is enhanced by changing at least one of its bandwidth, path, and packet priority. The service enhancements for an active service can include one or more Virtual Network Functions (VNFs) that enhance the active service. The network measurements can include historical measurements and on-demand measurements, wherein the on-demand measurements are selectively performed on the service enhancements. The cost can be determined based on a cost of adding the service enhancement in the network and the benefit can be determined based on increments to one of Quality of Service (QoS) and Quality of Experience (QoE) for the one or more candidate services. The increments to one of QoS and QoE can be based on one or more of lower required bandwidth, lower packet loss, higher throughput, and faster application response time. The service enhancements for an active service can include one or more Virtual Network Functions (VNFs) which are configured to enhance the active service, and where network measurements can include historical measurements and on-demand measurements, wherein the on-demand measurements are selectively performed with the one or more VNFs on the active service.

The one or more VNFs can include a plurality of VNFs with at least two of the plurality of VNFs being different types.

In a further exemplary embodiment, a Software Defined Network (SDN) network with a discovery engine configured to perform service enhancement discovery in the network includes a plurality of interconnected network elements; a controller configured to implement a control plane, wherein the controller is communicatively coupled to one or more of the plurality of interconnected network elements; and a server communicatively coupled to the controller and implementing a discovery engine configured to obtain network measurements from the network for one or more candidate services in the network, utilize the network measurements to determine one or more service enhancements for the one or more candidate services, determine a cost and a benefit for each of the service enhancements for the one or more candidate services, and provide the service enhancements for the one or more candidate services based on associated cost and associated benefit of each of the service enhancements. The service enhancements can be determined for an active service through determining one or more future times at which the active service is enhanced by changing at least one of its bandwidth, path, and packet priority. The service enhancements for an active service can include one or more Virtual Network Functions (VNFs) that enhance the active service. The network measurements can include historical measurements and on-demand measurements, wherein the on-demand measurements are selectively performed on the service enhancements.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 20 and 21 are flow charts of network management processes for service enhancement identification;

DETAILED DESCRIPTION OF THE DISCLOSURE

Figure 1A:
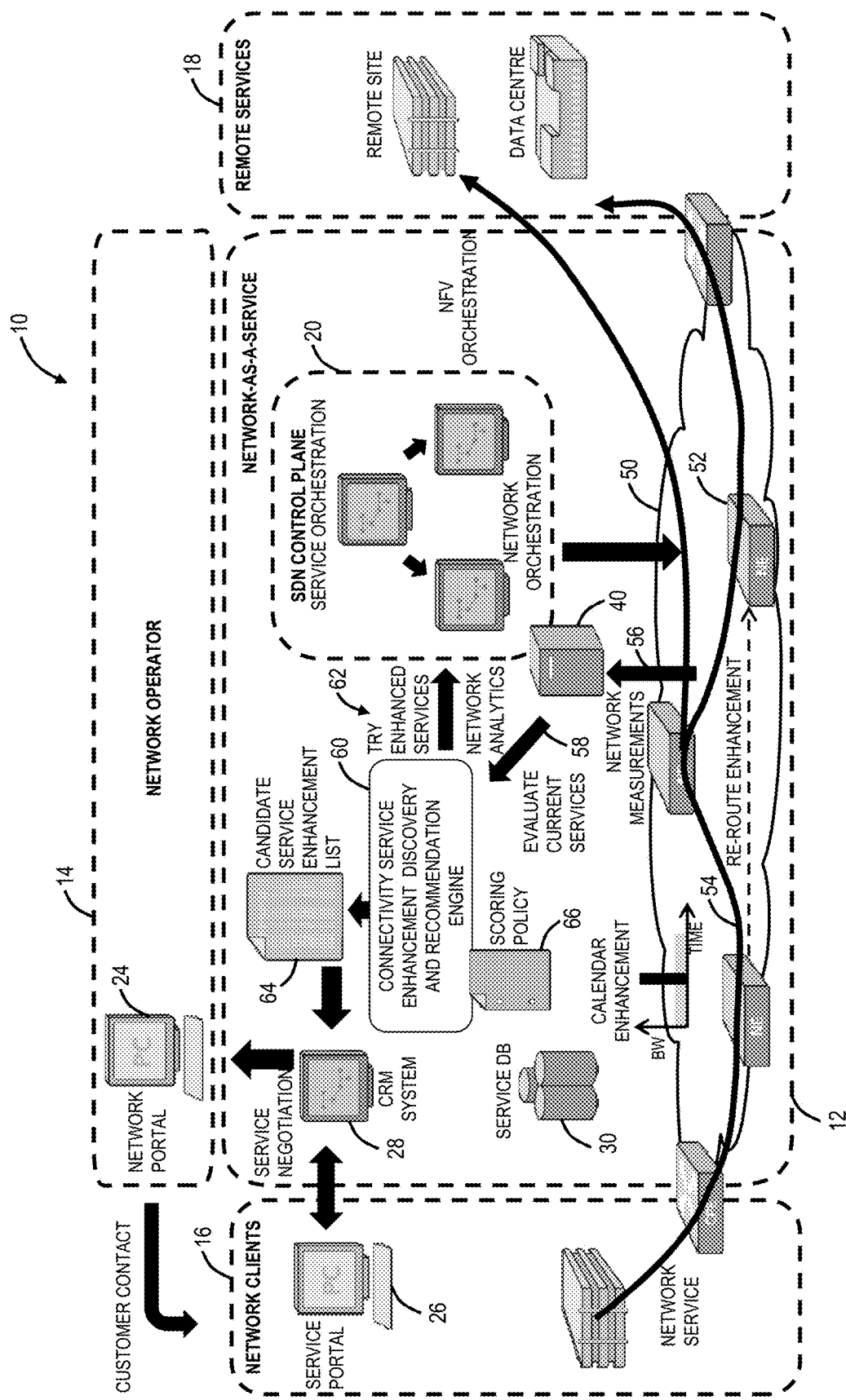
FIG. 1A is a network diagram of an SDN network with connectivity enhancement discovery and recommendations.

In various exemplary embodiments, the present disclosure relates to service enhancement discovery for connectivity traits (e.g., bandwidth, priority, etc.) and Virtual Network Functions (VNF) in network services. A key benefit of SDN is that it decreases the cost of running networks, i.e., decoupling control and data planes enables building of lower cost, commodity, network elements with centralized management decisions, allowing for more efficient use of resources. SDN also enables deeper understanding of network dynamics and customer behavior. The centralized nature of the SDN management plane enables a deeper understanding of network dynamics, since it requires centralized, global, view of the network. The global view of the network also allows a deeper understanding of what network clients may need to run their traffic more efficiently or with a higher quality-of-service (QoS) or quality-of-experience (QoE). QoS can be defined with objective measures such as latency, jitter, packet loss, effective bandwidth, and availability. QoE is defined in terms of user value with suitableness, flexibility, mobility, security, cost, personalization and choice. Note that for one level of QoS a customer may be willing to pay more for the same service, if it has a higher QoE.

SDN also provides a platform through which the end customer may customize their network. Specifically, SDN provides a programmable control and data plane along with centralized collection of network measurements. Since the network management is centralized and can be customized more easily than with conventional approaches, each customer can have individual management and control planes. SDN also enables deployment of VNF software appliances in the network, which allows each customer to customize their data plane. Additionally, insight into client behavior may provide a way to increase the revenue from the network. SDN can allow a network operator to understand which customers may benefit from enhanced services. For example, an enhanced service may decrease customer's traffic, thus freeing up resources for new customers. Accordingly, it is advantageous to the network operator to offer such an enhanced service to a customer for free or a small fee. The enhanced service may also benefit the customer so that the customer may upgrade and pay a higher fee. The enhanced service may solve a QoS/QoE problem the customer is having, or a problem the customer may have in the future. For example, the customer may be running out of network capacity or experience unwanted latencies, but not realize the full scope of the problem. In various exemplary embodiments, the systems and methods described herein, from the network point of view, can be used to identify which aspects of the customer service can be enhanced for service assurance, i.e. ensure that the service customer paid for is running according to agreed upon Service Level Agreements (SLAs). In various exemplary embodiments, the systems and methods described herein, from the network point of view, identify enhanced services which may benefit each customer, i.e., identify service enhancements that customer has not paid for yet, but that the customer may pay for since the SLA improves with the enhancements. The systems and methods can be used to identify service enhancements for individual flows, groups of flows, networks, sub-networks and customers.

Network Operating Environment

Figure 1B:
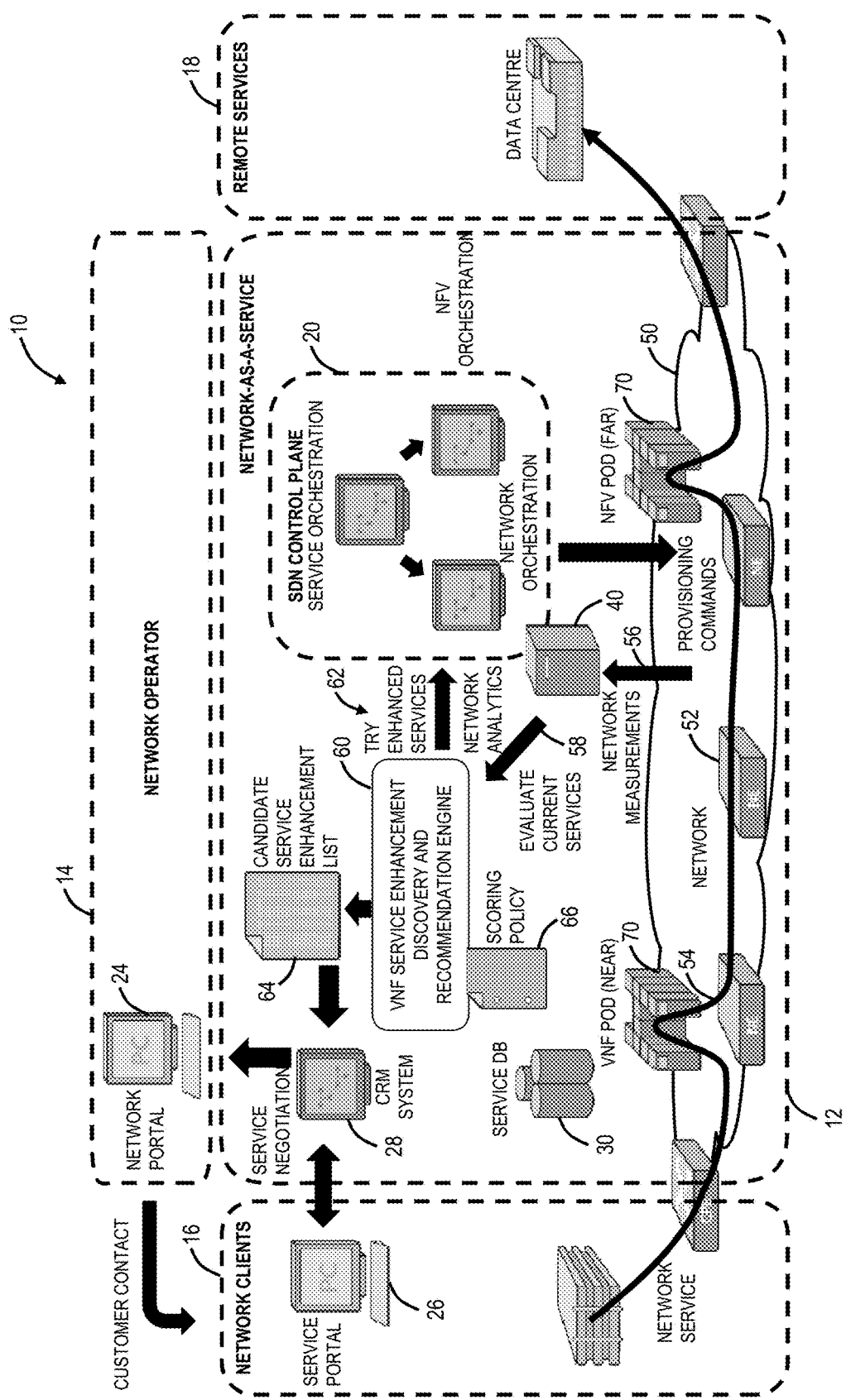
FIG. 1B is a network diagram of an SDN network with service discovery and recommendations in VNF-enabled networks.

Referring to FIGS. 1A and 1B, in an exemplary embodiment, a network diagram illustrates an SDN network 10. FIG. 1A illustrates connectivity enhancement discovery and recommendations, and FIG. 1B illustrates service discovery and recommendations in VNF-enabled networks. Specifically, the systems and methods described herein contemplate using the SDN network 10 to recommend service enhancements with FIG. 1A illustrating connectivity enhancements for the service enhancements and with FIG. 1B illustrating VNF services for the service enhancements. Those of ordinary skill in the art will appreciate the SDN network 10 is presented for illustration purposes and the systems and methods described herein contemplate other implementations as well. The SDN network 10 includes four logical groupings—a network-as-a-service (NaaS) 12, a network operator 14, network clients 16, and remote services 18. The network-as-a-service 12 includes an SDN control plane 20 that communicates with various applications 22 for implementing the systems and methods described herein. Note, the SDN control plane 20 may also be referred to as an SDN management plane. The network operator 14 can include a network portal 24, the network clients 16 can include a service portal 26, and the network-as-a-service 12 can include a Customer Relationship Management (CRM) system 28 and a service database 30. Network analytics for the SDN control plane 20 is configured to operate on one or more servers 40 or other processing devices.

The network-as-a-service 12 includes a network 50 formed by a plurality of network elements 52, i.e., a plurality of interconnected network elements. The network 50 can provide connectivity and network services 54 at Layers 0, 1, 2, and/or 3. That is; the network 50 can be an optical network providing Time Division Multiplexing (TDM) and/or packet connectivity between the network clients 16 and the remote services 18. The network elements 52 can be switches, routers, Wavelength Division Multiplexing (WDM) platforms, Packet-Optical Transport Systems (POTS), and combinations thereof. The network elements 52 are hardware devices that transmit/receive/switch data in the network 50, and some or all of the network elements can be controlled by the SDN control plane 20. The network elements 52 are configured to collect network measurements, such as Operations, Administration, and Maintenance (OAM) data, such as packet counters, as well as performing functions such as Deep Packet Inspection (DPI) of packet headers for additional measurement data. In various exemplary embodiments, network measurements 56 are provided to the SDN control plane 20 from the network 50, network analytics 58 are provided to a service enhancement discovery and recommendation engine 60 which is configured to perform various aspects of the systems and methods to determine and suggest enhanced services for the network clients 16 in the network 50. In FIG. 1A, the service enhancement discovery and recommendation engine 60 is for connectivity service enhancements, and in FIG. 1B, the service enhancement discovery and recommendation engine 60 is for VNF service enhancements.

Service enhancement identification may be done at any granularity of the network clients 16, within the same organization or between two organizations, etc. In large organizations, an IT department responsible for network operations may be considered as a network operator while other IT or internal departments may be clients. In an enterprise-carrier relationship, the carrier provides network services to the enterprise clients. Service enhancement identification can be used for both scenarios, or for any other granularity of the network clients 16. The CRM system 28 is a configured to track customer requests, services, billing and may present a view of the services to the customers and negotiate prices with the customer. The CRM system 28 is closely coupled, or even implemented as part of Operations Support Systems (OSSs), and the CRM system 28 can be communicatively coupled to the network portal 24 and the service portal 26.

The service database 30 contains information about currently active services and customer using them. The network analytics 58 includes a collection of current information about the network 50, such as, e.g., packet counters, allocated bandwidths, traffic patterns, connection behavior, and the like. The network analytics 58 can be performed in the SDN control plane 20 or in another application to analyzes information and produce inputs suitable for the service enhancement identifier, in the service enhancement discovery and recommendation engine 60. The SDN control plane 20 orchestrates services across the network 50, and may include several controllers (SDN, NFV) which are controlled by an orchestrator. The SDN control plane 20 manages bandwidth resources and provisions bandwidth, forwarding tables, optical spectrum, lasers, etc. The SDN control plane also manages compute and store resources for NFV Virtual Machines (VMs) and provisions and launches VMs. The network clients 16 can include customer premise equipment (CPE) that can be hardware network elements or software NFV elements configured to perform network edge functions. The service enhancement discovery and recommendation engine 60 is configured to determine which service enhancements are beneficial to specific customers of the network clients 16, such as associating a score with each enhancement based on scoring policy input as well as implementing the enhancements in the network 50.

Service Enhancements

The service enhancements are defined relative to an existing network service 54. A service enhancement may improve customer's Quality-of-service (QoS) or Quality-of-experience (QoE) experience thus benefiting the customer, so the customer may pay more for the enhanced service. A service enhancement may benefit the network 50 by making the connection more efficient so that the customer may pay the same or less for the enhanced service. For example, an existing service may be enhanced by changing the data plane to compress the packet stream, which increases available capacity to other flows. Alternatively, an existing service may be enhanced by adding packet filtering, caching, or redirection, which decreases unneeded network traffic, thus increasing available capacity. Service enhancements may be used to improve QoE if some part of the network 50 includes third party providers. For example, an existing service may be enhanced with better encryption on the segments using the third party providers.

For internally run services, service enhancements may be used to decrease the cost of information technology services. For example, internal systems may be set up so that each department pays for the network services 54 out of its budget. It may be the case that departments may accept network enhancements that lower their long-term cost. A service enhancement may be transferring an existing service implemented with a hardware element to an equivalent VNF-service, which reduces the cost to the enterprise. In enterprise networks, where the IT department is the network operator, service enhancements may be used to decrease the cost of information technology services. Here, service enhancements are offered to internal clients as opposed to external clients. Internal systems may be set up so that each department pays for network services out of its budget, and it may be the case that departments may accept network enhancements that lower their long-term cost. The service enhancements present a win-win situation for the network operator 14 and the network clients 16. For example, the clients 16 may be offered an enhancement that may delay hardware upgrade. Also, an existing service may be assigned a higher privacy setting through encryption, which enhances customers QoE, with the customer paying a higher network access fee. Various other embodiments are also contemplated.

Connectivity Service Enhancements

For connectivity service enhancements, in FIG. 1A, the systems and methods relate to on-demand Ethernet, Optical Transport Network (OTN), or packet-optical networks. In particular, the systems and methods use the network analytics 58 to discover and recommend connectivity enhancements to the network services 54. The network service 54 can be defined as a point-to-point, point-to-multipoint, or multipoint-to-multipoint connection or virtual private network, which has associated with it a Service Level Agreement (SLA) committing the network 50 to support its QoS. An SLA is defined with guarantees or limits on the availability (connection uptime), bandwidth, packet loss, latency, and/or jitter. SLAs may have a time component where the QoS commitments may be different at different times, for example, guaranteed bandwidth may change over time. A connectivity enhancement to the network service 54 is a change in how the service is implemented in the network that either (1) improves its SLA immediately, permanently at future times or periodically over a period, for a higher network access fee, or (2) improves the clients QoE, defined with suitableness, flexibility, mobility, security, cost, personalization and choice, while maintaining its SLA. For example, the connectivity enhancement relates to connectivity traits such as, without limitation, bandwidth, path, and packet priority.

Examples of connectivity service enhancements, labeled as E1-E7, can include any of E1) increase or decrease bandwidth, E2) change from static bandwidth to on-demand usage, E3) increase or decrease bandwidth with a calendar, E4) adjust a calendar, E5) re-route, E6) increase or decrease protection level, E7) increase or decrease QoS priority, etc. For bandwidth changes, client network traffic may grow over time, resulting in degraded service at a future time. The network analytics 58 can be used to forecast client's network usage and to recommend bandwidth upgrades to the network client 16 while giving the network operator 14 enough lead-time for network reconfiguration or upgrades. The knowledge of the required future upgrade introduces business predictability to both the operators 14 and their clients 16.

For a change from a static usage model to an on-demand usage model, to avoid excessive packet losses, in a static usage model, the network clients 16 subscribe to bandwidth levels that match their peak bandwidth. Changing to an on-demand usage may save the client 16 money and thus improve Quality-of-Experience (QoE). At the same time, this change frees up network resources for other clients 16 as to increase the operator's 14 revenue. For an increase or decrease bandwidth with a calendar, the client network traffic may experience prolonged bursts at regular intervals (i.e. business traffic during workdays, or weekly back-ups). The network analytics 58 can be used to forecast client's diurnal network usage and to recommend a bandwidth schedule that matches it, to improve QoS in busy times or to decrease client's costs in quiet times. By adjusting the calendar to match actual network usage, the client 16 only pays what it needs for the service while network efficiency is increased.

For the calendar adjustments (e.g. schedule connection or bandwidth earlier or later), the clients 16 may have services, which are flexible in their start times (e.g. weekly back-ups, cloud storage syncs), or services which are inflexible in their start time (live media events). As the price of network services 54 may change over time, it may be advantageous to forecast the number of higher paying inflexible services and re-schedule low paying flexible connections from busy periods to quiet periods on shared network equipment. Flexible clients are compensated for lower access costs while the network 50 makes higher revenue with a higher number of high-paying services. For re-route connections (increase or decrease latency, avoid parts of network), the network operator 14 may use the network analytics 58 to better match current and future traffic demands to existing capacity (e.g. after new connections are accepted, or network defragmentation is run). This process may indicate that new alternative paths have become available for some of the connections. As the price of network services 54 may change over time it may be advantageous to move some of the connections from highly demanded paths to less demanded paths. The clients 16 are compensated for lower access costs while the network 50 makes higher revenue.

For an increased or decreased protection level (unprotected, 1+1 protection, mesh restoration), with the network analytics 58, it may be possible to track and forecast network failures in parts of the network 50 and suggest a higher level of protection to the client 16. For an increase or decrease QoS priority at future times or with a calendar, the network operator 14 may use network analytics to forecast future or diurnal packet losses, which may be estimated from estimates and forecasts of utilization. The client 16 may be offered to transition from a lower QoS class to a higher QoS class during busy periods or at a future point in time. The client 16 benefits from lower packet losses, while the network operator 14 increases revenue with delayed hardware upgrades. Note, all of the above service enhancements can be used in OTN, packet, or packet-optical networks except for the last one which is exclusive to packet and packet-optical networks.

In FIG. 1A, for the connectivity service enhancements, the service enhancement discovery and recommendation engine 60 is configured to use the network analytics 58 to discover potential connectivity service enhancements, and then make recommendations 62 on which enhancements to adopt, based on the benefits of an enhancement and the cost of providing it. Using the service enhancement discovery and recommendation engine 60, the network operator 14 can make recommendations for value-added service changes to its clients 16, where a service change results in a win-win situation for the operator 14 and the client 16. The systems and methods are designed to increase operator profits while promoting client stickiness.

The service enhancement discovery and recommendation engine 60 determines which existing clients 16 may benefit from additional network enhancements and produces a candidate service enhancement list 64. Again, the service enhancements can be identified from collected measurements on existing services, or by collecting new measurements, i.e., on-demand measurements, collectively the network measurements 56. Each enhancement is evaluated for its costs and benefits and ranked using a set scoring policy 66. The identified service enhancement can be used to offer enhanced services to the client 16. The purpose of producing the candidate service enhancement list 64 is to assist the network operator 14 in increasing revenue or decreasing cost by offering value-added services to the clients 16.

VNF Service Enhancements

For VNF service enhancements, in FIG. 1B, the systems and methods discover and recommend VNF enhancements for the network services 54. Again, the network service 54 is a point-to-point, possibly multi-hop, connection, which has associated with it bandwidth (reserved or shared) and certain data plane functionalities provided through VNF-enabled via points. VNFs via points may be set up on customer premise equipment (CPE) or on VNF points-of-delivery (POD) sites 70. Point-to-multipoint and multipoint-to-multipoint services can be built from point-to-point connections. While the infrastructure for VNF deployments is now taking shape with VNF orchestrators, VNF network management systems (NMSs), and VNF virtual appliance stores (such as Agility Matrix available from Ciena Corporation), there is still no automated way for the network clients 16 to know which VNFs offer worthwhile benefits, or for network operators 14 to recommend VNFs to the network clients 16. In the pay-as-you-earn VNF model, it is very important for the network operator 14 to be able to make good recommendations for VNF-based services to its clients 16 both to increase profit and to ensure client stickiness.

Accordingly, the systems and methods use the network analytics 58 to discover potential VNF service enhancements and to determine their incremental benefit and importance to network operators 14 or their network clients 16. Using the service enhancement discovery and recommendation engine 60, the network operator 14 can make recommendations for value-added VNF service upgrades to its clients 16. Examples of service enhancements with VNF can includes adding any of load balancing, caching, data encryption, data compression, "latency compression", packet filtering, routing, additional compute or storage resources, or the like. Enabling a service enhancement through VNF may require installing and provisioning one or more virtual appliance or VM in the network 50. This is similar to installing new hardware equipment, however with much lower cost and almost instantaneous service turn-up.

The service enhancement discovery and recommendation engine 60 first discovers and creates a list of potential service enhancements for an active service and then ranks the enhancements according to their costs and benefits. An active network service can be enhanced by adding a VNF to its service chain, which may improve its Quality of Service (QoS) (e.g. data compression, latency reduction, application level prioritization etc.) or Quality of Experience (QoE) (e.g. encryption, adding a managed VNF service).

The service enhancement discovery and recommendation engine 60 can be part of the VNF-enabled network architecture and connect the CRM system 28 and the SDN control plane 20. The service enhancement discovery and recommendation engine 60 can act as a server for the CRM system 28 and produce the candidate service enhancement list 64 for currently active network services. The candidate service enhancement list 64 can contain, for each active service, a set of enhancement VNFs, which individually or chained together, result in an incremental improvement in QoS or QoE to the client 16. For each enhancement VNF, the list 64 contains its quantitative benefit, cost, revenue and a score. The score is calculated based on a scoring policy 66, which is provided as an input to the service enhancement discovery and recommendation engine 60. The CRM system 28 may use the candidate service enhancement list 64 to make prompted or unprompted recommendations to the client 16 through the service portal 26, or to generate a list of sales leads for the network operator 14. In FIG. 1B, the service enhancement discovery and recommendation engine 60 uses the network analytics 58 to monitor network performance and discover which VNFs may be helpful to improve network performance.

Candidate Service Enhancement List

The candidate service enhancement list 64 contains sufficient information to identify clients 16 who may benefit from service enhancements, as well as how the clients 16 and the network 50 benefit from the enhancements. For example, the list 64 can contain client identities and a list of service enhancements for the clients 14 of each enhancement. The client identifies can include name, address, phone, e-mail of the client 16, unique database key used to identify client 16 in service providers databases, etc. The list 64 can include i) a name or unique identifier of the enhancement, sufficient to identify the enhancement in the CRMS; ii) connectivity enhancement information such as a path of the enhancement, bandwidth of the enhancement, priority of the enhancement, and times when the enhancement should be active (always on, periodically on, activated on-demand); iii) a quantitative or qualitative description of the benefits obtained with the enhancement such as an estimated improvement in QoS with the enhancement (e.g., decrease/increase in latency, decrease in packet loss or an information card describing the QoE benefits of the enhancement; iv) a quantitative description of the cost of the enhancement to the client 16 (revenue to the network 50) such as a list price for a service enhancement based static pricing advertised by operator 14, a dynamic price for the service enhancement based on service demand, a cost of hardware upgrades required to activate the enhancement, etc.; and v) a quantitative description of the cost of the enhancement to the network such as licensing costs for the virtual appliance or VM, cost of buying and installing additional equipment if necessary for the enhancement, installation cost for the service (e.g. man-hour cost), etc. The list 64 may be in a variety of formats applicable to machine processing such as a text file, an eXtensible Markup Language (XML) file, a Structured Query Language (SQL) or other type of relational database file, or the like. In VNF settings, each enhancement may be an isolated VNF or a service chain of VNFs. Since most VNFs come prepackaged in virtual appliances, VNF service chaining may be tied to specific appliances.

SDN Environment

Figure 1C:
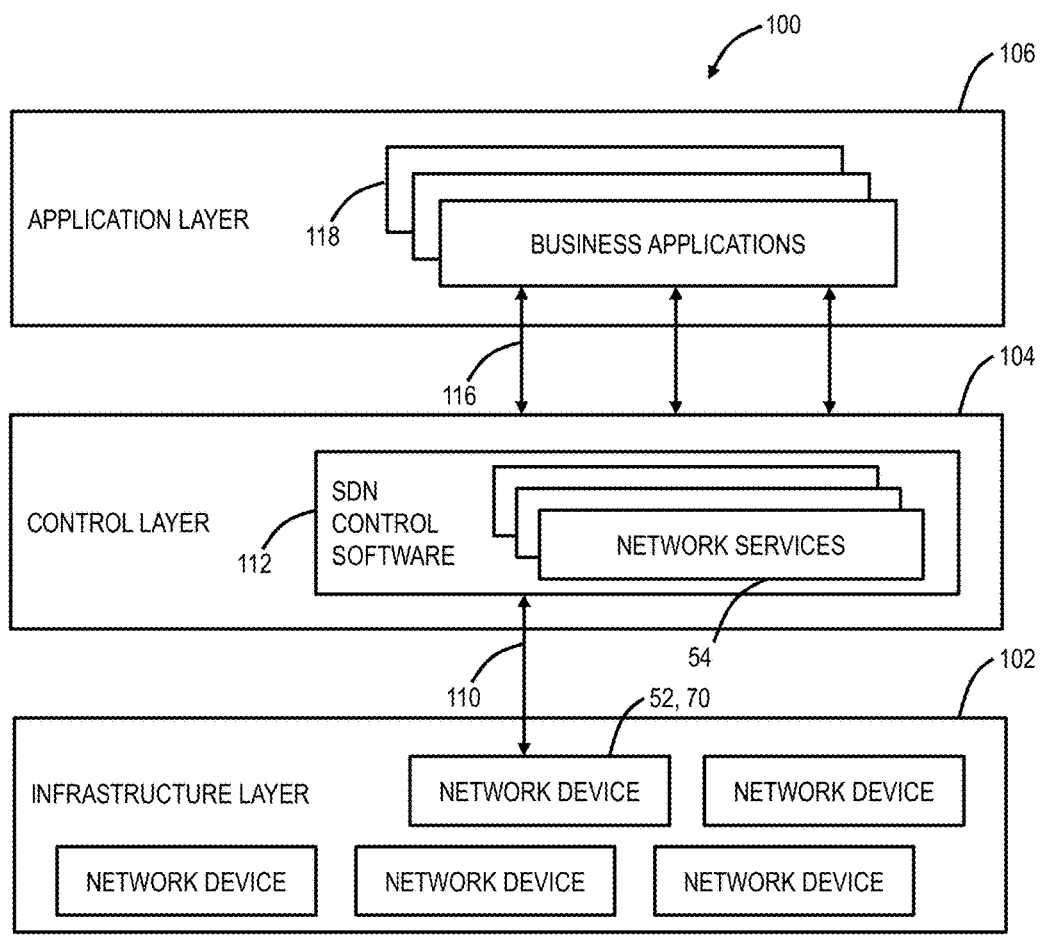
FIG. 1C is a block diagram of functional/logical components of an SDN environment.

Referring to FIG. 1C, in an exemplary embodiment, a block diagram illustrates functional/logical components of an SDN environment 100. The SDN environment 100 includes a programmable infrastructure layer 102, a control layer 104, and an application layer 106. The programmable infrastructure layer 102 includes network devices such as the network elements 52, the VNF POD sites 70, and other components in the network 50 and is communicatively coupled to the control layer 104 via a control plane interface 110 such as OpenFlow, for example, or any other SDN protocol. The control layer 104 facilitates communication between the application layer 106 and the network devices 52, 70 located in the programmable infrastructure layer 102. The control layer 104 includes SDN control software 112 which control a plurality of network services 54. The control layer 104 provides SDN functionality to manage network services through the abstraction of lower level functionality. For example, the SDN control plane 20 can be implemented in full or in part through the control layer 104. The application layer 106 communicates with the control layer 104 through various Application Programming Interfaces (APIs) 116. The application layer 106 provides end user connectivity to the SDN such as software modules and/or functions responsible for creating desired path and flow connections on the physical network through various business applications 118. In various exemplary embodiments, components in the SDN network 10 such as the service enhancement discovery and recommendation engine 60 can be implemented in the control layer 104, in the application layer 106, as one of the business applications 118, etc.

Connectivity Service Enhancement Discovery and Recommendation Process

Figures 2, 3:
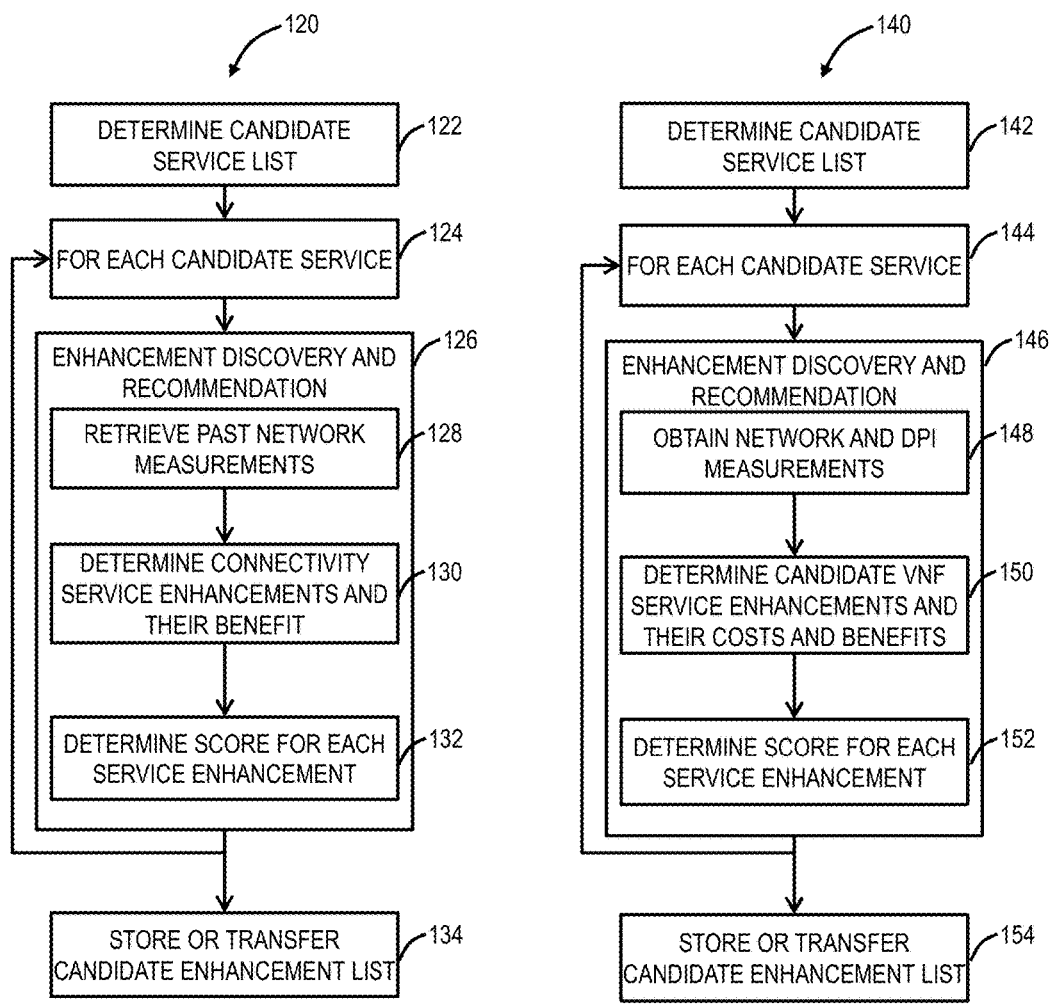
FIG. 2 is a flow chart of a connectivity service enhancement discovery and recommendation process.
FIG. 3 is a flow chart of a VNF service enhancement discovery and recommendation process.

Referring to FIG. 2, in an exemplary embodiment, a flow chart illustrates a connectivity service enhancement discovery and recommendation process 120. The process 120 contemplates the operation in the SDN network 10, such as through the engine 60. The process 120 includes determining a candidate service enhancement list 64 (step 122) and, for each candidate service (step 124), performing an enhancement discovery and recommendation (step 126). The candidate service enhancement list 64 is used to limit the scope of the discovery process. The candidate service enhancement list 64 may be input directly by a user such as through a Graphical User Interface (GUI) associated with one of the portals 24, 26. The candidate service enhancement list 64 may also be inferred from the actions performed by the user (if the user is interrogating a certain part of the network 50). The candidate service enhancement list 64 may also be automatically determined by performing the network analytics 58. For example, faults may be continuously monitored to determine trends and select services with rising in rising trend fault levels. Bandwidth usage, packet loss or jitter, may also be continuously monitored and checked for threshold crossings. Bandwidth usage trends may be observed and monitored to forecast when thresholds may be crossed in the future.

In the enhancement discovery and recommendation (step 126), the process 120 includes retrieving past network measurements (step 128), determining connectivity service enhancements and their benefit (step 130), and determining a score for each service enhancement (step 132). In the end, the process 120 includes storing or transferring the candidate service enhancement list 64 (step 134). The process 120 examines the candidate service enhancement list 64 for possible enhancements and scores the enhancements by their benefit. Here, past network measurements are sufficient to obtain connectivity service recommendations. The network analytics 58 are used to select a list of enhancements (bandwidth increases, priority change, re-routing, etc.) and times when they should be active that may result in improved QoS. The service enhancements are scored on their potential benefit, and the scoring may be done according to currently active policy. The policy is used to evaluate the enhancement from the point of view of the network operator 14, or client 16 (depending on who sets it).

VNF Service Enhancement Discovery and Recommendation Process

Referring to FIG. 3, in an exemplary embodiment, a flow chart illustrates a VNF service enhancement discovery and recommendation process 140. The process 140 contemplates the operation in the SDN network 10, such as through the engine 60. The process 140 includes determining a candidate service enhancement list 64 (step 142) and, for each candidate service (step 144), performing an enhancement discovery and recommendation (step 146). The candidate service enhancement list 64 is used to limit the scope of the discovery process. The candidate service enhancement list 64 *t* may be input directly by a user such as through a Graphical User Interface (GUI) associated with one of the portals 24, 26. The candidate service enhancement list 64 may also be inferred from the actions performed by the user (if the user is interrogating a certain part of the network 50). The candidate service enhancement list 64 may also be automatically determined by performing the network analytics 58. For example, faults may be continuously monitored to determine trends and select services with rising in rising trend fault levels. Bandwidth usage, packet loss or jitter, may also be continuously monitored and checked for threshold crossings. Bandwidth usage trends may be observed and monitored to forecast when thresholds may be crossed in the future.

In the enhancement discovery and recommendation (step 146), the process 140 includes obtaining network and DPI measurements (step 148), determining candidate VNF service enhancements and their costs and benefits (step 150), and determining a score for each service enhancement (step 152). In the end, the process 140 includes storing or transferring the candidate enhancement lists (step 154). The process 140 examines the candidate service list for possible enhancements and scores the enhancements by their benefit. Determining, which enhancements are best suited for each service, may require deeper network analytics than analytics that tagged the service as a candidate service. The process 140 may temporarily turn on DPI for tagged services and even clone and deliver service packets to a designated DPI measurement point. There are multiple ways to discover service enhancements. First, it may be possible to determine enhancement candidates by looking at past data using matching to if available. Second, it may be possible to determine enhancement candidates by activating new data collection and looking at new measurements, i.e., on-demand measurements that can be selectively performed on the service enhancements, or a combination of new and old measurements. Third, it may be possible to activate the enhancement service temporarily and measure the benefit. Fourth, an enhancement may already be used in the network (e.g. encryption with the hardware appliance) indicating the client 16 may want an upgrade to the virtual appliance.

Determining service enhancements may be a distributed function, where some of the enhancement discovery is performed by special software coupled to VNFs. The service enhancements are scored on their potential benefit. There may be multiple enhancements with similar benefits, so scoring helps in ranking them. Scoring may be done according to a scoring policy, and policies may be user specific and may be set by clients 16 or operator 14. The output of the process 140 is a candidate service enhancement list 64, which contains information sufficient to display it to a client 16, network operator 14, or to produce business reports or sales leads. Service enhancement and discovery may be implemented as a monolithic system performing the above steps or in an architecture where two separate entities perform the discovery and scoring of enhancements.

The process 140 detects how currently active services can be improved by adding a VNF as well as recommending VNFs, by the way of scoring them based on their costs and benefits. The input to the process 140 is a list of candidate services, which can be provided by the CRM system 28. Candidate services may be obtained from the network analytics 58 by finding services in need of QoS or QoE improvements, explicit user requests, or it can be inferred from user's actions in the service portal 26.

Given a list of candidate services, the process 140 proceeds to an in-depth analysis of its network measurements. Again, from the SDN network 10, the network measurements 56 are provided to a network analytics engine, which collects network measurements and determines an appropriate statistical representation for them. The process 140 relies on the network measurements 56 such as packet counters, latency and jitter measurements, DPI measurements such as application level packet loss, Transmission Control Protocol (TCP) latency, content replication, and stateful DPI measurements, and VNF hardware measurements such as throughput, latency and utilization. As the collection of DPI measurements is expensive in terms of computation and storage, the process 140 may activate DPI on-demand for the selected candidate services.

Given the measurements, the process 140 proceeds to evaluate the benefits of available VNFs. For some VNFs, it may be possible to use a table lookup to evaluate the benefits, while for others it may be necessary to run traffic in tandem through the VNF and see how much benefit there is. The process 140 includes a plug-in into the process 140 for the virtual appliances to provide for their benefits evaluation. This allows various VNF vendors with a way to use best evaluation methods for their specific virtual appliances.

After determining the benefit of each enhancement, the process 140 proceeds to calculate the score for the service enhancement. To calculate the score, the process 140 may calculate the revenue that can be obtained by adding the enhancement to the existing service (what the client 16 would pay for the enhancement) and the cost of adding the enhancement to the network 50 (licensing costs, additional hardware, lost opportunities for new business). The score is calculated using the enhancement benefits and its revenue and cost, according to the scoring policy associated with the client 16. The client 16 or the network operator 14 may set the scoring policy. The score may be calculated to maximize QoS, minimize network cost, maximize revenue, maximize profit, as desired by the network operator 14 or client 16 by setting the appropriate policy.

The final step in the process 140 is to transfer the candidate service enhancement list 64 to the intended audience. For example, the candidate service enhancement list 64 may be displayed in the network portal 24 or the service portal 26, saved in a database, e-mailed, etc. The network portal 24 or the service portal 26 may use enhancement scores to prioritize which enhancements are shown to the client 16 or the operator 14. Note that since the candidate service enhancement list 64 may be stored in a database, the CRM system 28 may use it for services which are not active at the time of a query, if, for example, a client 16 terminates a service and wishes to sign-up for it again.

Service Enhancement Discovery and Recommendation Engine Split-Architecture

Figure 4:
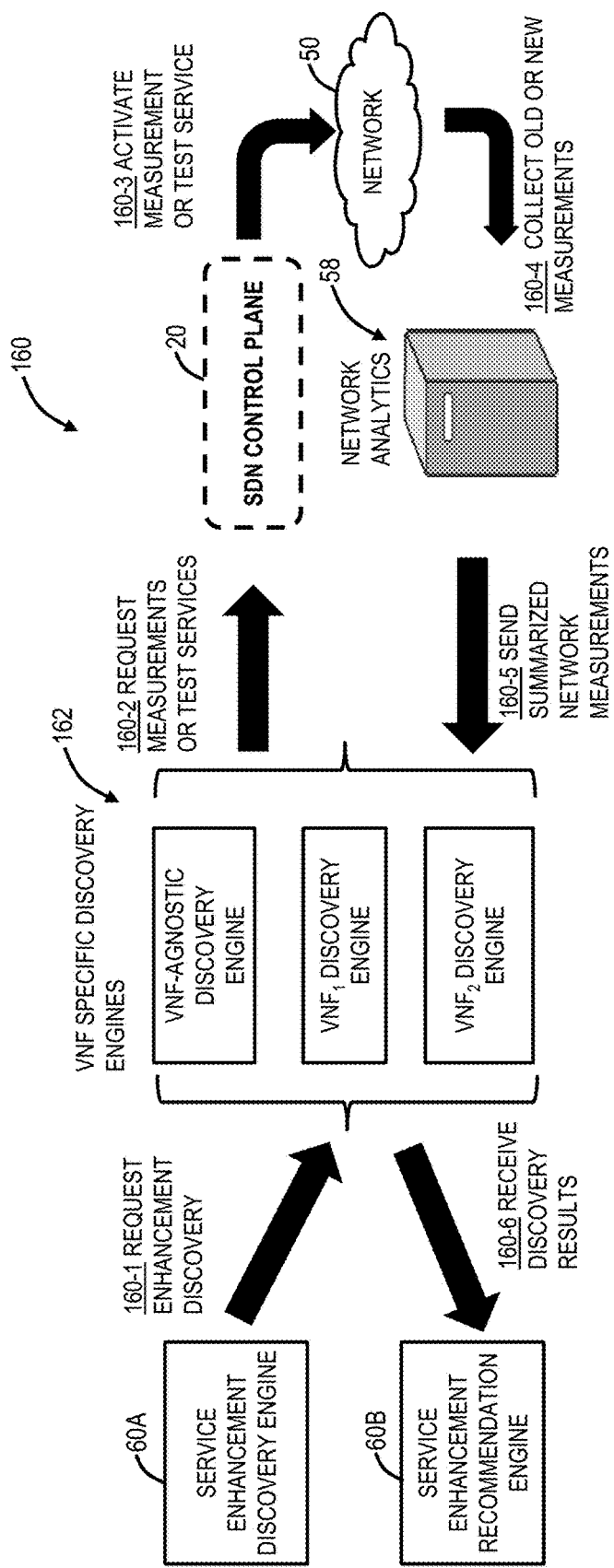
FIG. 4 is a flow diagram of a service enhancement discovery and recommendation engine split-architecture.

Referring to FIG. 4, in an exemplary embodiment, a flow diagram illustrates a service enhancement discovery and recommendation engine split-architecture 160. The split-architecture 160 describes the functionality of the service enhancement discovery and recommendation engine 60 relative to VNF service enhancements. The service enhancement discovery and recommendation engine 60 is split into a service enhancement discovery engine 60A and a service enhancement recommendation engine 60B. The engines 60A, 60B interact with VNF specific discovery engines 162 which in turn interact with the SDN control plane 20, the network 50, and the network analytics 58. The engines 162 can include a VNF-agnostic discovery engine as well as specific VNF discovery engines (labeled as $VNF_1$, $VNF_2$). The engines 60A, 60B, 162 contemplate operation in the SDN network 10, such as on one or more servers, as the business applications 118, on an SDN controller, etc. The split-architecture 160 includes the engine 60A requesting an enhancement discovery from the engines 162 (step 160-1), the engines 162 requesting measurements or test services through the SDN control plane 20 (step 160-2), the SDN control plane 20 activating the measurements or test services in the network 50 (step 160-3), collection of old or new measurements from the network 50 to provide the network analytics (step 160-4), sending summarized network measurements to the engines 162 (step 160-5), and the engine 60B receiving discovery results from the engines 162 (step 160-6).

A variety of vendors manufactures VNFs, so it may not be possible for a generic system to detect and evaluate all enhancements optimally. Thus, the split-architecture 160 is used, where detection and evaluation of enhancements are performed separately from scoring, which may be better in some cases. Each virtual appliance may contain a multitude of VNFs, so it may best left to the appliance to determine its usefulness. The split-architecture 160 is also be modular with VNF-specific discovery engines, where each VNF virtual appliance implements its mapping of network measurements to a benefit. The discovery engines 162 can be provided as a plug-in component into the split-architecture 160. The discovery engines 162 perform the limited task of discovering which enhancements are possible and what their QoS benefit is. The discovery results provided by each discovery engine 162 may list some of the fields in the candidate service enhancement list 64, especially the name of the enhancement and its incremental QoS improvement. It may be possible for the discovery engine 162 to communicate with the SDN control plane 20 to set up temporary DPI measurement points. The discovery engines 162 give each vendor an opportunity to instantiate discovery mechanisms specific to their technology. The network analytics 58 gives a summary of measurements which may be used by the discovery engines 162 (mean, variance, trends, seasonality). Based on the network measurements 56, a VNF-specific module may determine the benefit of its service. It may also be possible temporarily activate VNF enhancements on a copy of the traffic stream and observe the benefits and directly compare them to the original stream which is not using the enhancements.

Network Analytics for VNF-Based Service Enhancements

The network measurements are used to assess the enhancement benefits of using a specific VNF. The benefit of some VNFs may be obtained by looking at past measurements and predicting the incremental QoS improvement (packet counters, loss, etc.). Alternatively, the benefit of a VNF service may only be discovered after activating some new functionality in the network 50, such as through network measurements 56 includes latency, jitter, measurements with packet injection (ICPM, RFC2544, ITU Y.1564), Compressibility measurements by compressing a sample of the traffic. Some of the new measurements may be obtained by sending cloned traffic along an alternative path that has specific NFVs enabled, or where specialized (DPI) equipment is placed.

The following is a list of examples of the network measurements 56 for determining appropriate VNF enhancements:

---

Traffic volume for source-destination pair
Traffic volume for source-destination pair and traffic type
Packet loss for source-destination pair
Packet loss for source-destination pair and traffic type
Latency for source-destination pair
Latency for source-destination pair and traffic type
Network interest matrix
Network interest matrix and traffic type
Utilization of VNF hardware
Utilization of VNF hardware by traffic type (control vs. data)
Responsiveness of VNF virtual appliances
Responsiveness of VNF virtual appliances by traffic type

---

Network measurements obtained for source-destination pairs can be combined with measurements for sub-networks with merging of the measurements. Network measurements may be summarized statistically using a representative bandwidth calculator, such as described in commonly-assigned U.S. patent application Ser. No. 14/604,875 filed Jan. 26, 2015 and entitled "REPRESENTATIVE BANDWIDTH CALCULATION SYSTEMS AND METHODS IN A NETWORK," the contents of which are incorporated by reference herein. Traffic type may correspond to various types of traffic: data vs. control traffic, business vs. recreational traffic, etc. Each traffic type may be further broken down by sub-type, which may correspond to applications using the traffic, e.g. YouTube and Azure are both Hypertext Transfer Protocol (HTTP) traffic, but they are different applications.

Network measurements of traffic type may require deep packet inspection (DPI) capabilities. Some DPI measurements may be stateful (e.g., for determining the type of TCP traffic with machine learning as shown in W. Li and A. W. Moore, "A Machine Learning Approach for Efficient Traffic Classification," Proceedings of the Fifteenth IEEE International Symposium on Modeling, Analysis, and Simulation of Computer and Telecommunications Systems (MASCOTS '07)." Since DPI capabilities in the network 50 are limited and/or costly, the systems and method may need selectively to activate DPI measurements on a subset of traffic and possibly route some traffic to specific DPI hardware. A resource manager may be deployed to allocate resources to the service enhancement discovery service.

Score Determination for Service Enhancements

The scoring of service enhancements is done based on the policy input with policies associated with clients records and which may be set by the operator 14 or the client 16. Several policies may be possible based on the interests of the network operator 14. For carrier operators, the policies may be geared towards service enhancements with higher profitability while, for enterprise operators, policies may be geared towards lower costs, etc. That is; different users may have a preference for lower cost or best QoS. For the purposes of the scoring, it is required to quantify the cost or the benefit of a potential enhancement. The incremental cost can be found by comparing the cost of running the service with and without the enhancement. For VNF service enhancements, components of the cost may come from licensing costs associated with required VNF, from additional hardware required to run the new VNFs, or an opportunity cost of a new customer with a different service that may need to share the same VNF hardware. QoS improvement can be obtained through predictive techniques. For example, given the compression level what is the reduction in traffic, thus reduction in utilization, thus a reduction in packet loss. Given the increase in bandwidth what is the reduction in traffic, thus reduction in utilization, thus a reduction in packet loss. Given the increase in prioritization what is the reduction in packet loss.

Example scoring policies can include a lowest cost policy, a best QoS improvement policy, a highest revenue enhancement policy, a most profitable enhancement policy, etc. For the lowest cost policy, the enhancements are scored based on how much cost they reduce in the network 50. For example, given the cost in dollars, a score can be obtained dividing one by the cost. For the best QoS improvement policy, the enhancements are scored based on how much the QoS is improved. For example, given a predicted improvement in packet loss, the score can be obtained by dividing one by the packet loss. For the highest revenue enhancement policy, the enhancements are scored based on much the revenue is impacted. For the most profitable enhancement policy, the enhancements are scored based on profit. For example, given the incremental cost and revenue associated with each enhancement, their score is based on their difference. For example, cost is determined based on a cost of adding the service enhancement in the network and the benefit is determined based on increments to one of Quality of Service (QoS) and Quality of Experience (QoE) for the one or more candidate services. The increments to one of QoS and QoE can be based on one or more of lower required bandwidth, lower packet loss, higher throughput, and faster application response time.

Mapping of Network Measurements to VNF-Based Service Enhancements

The following table illustrates some exemplary network measurement conditions with associated service enhancements and VNF-based implementations. Specifically, this table shows how to use the network measurements 56 to detect current network functionality that may be mapped to equivalent VNF network functionality for improved QoE and possibly QoS.

| Network measurement condition | Service enhancement | VNF-based implementation |
| --- | --- | --- |
| Packet loss exceeds threshold<br>Jitter exceeds threshold | Load balancing (data plane) | Domain Name System (DNS) reflection<br>HTTP reflection<br>Equal-cost multi-path (ECMP) |
| Control packet loss exceeds threshold<br>Control server overload exceeds threshold | Load balancing (control plane) | Session Initiation Protocol (SIP) controller reflection<br>SDN controller re-zoning |
| Packet loss for a specific network application exceeds threshold | Packet loss reduction (intra-customer prioritization) | Application-level packet prioritization |
| Portion of address reaching given server exceeds threshold<br>Network interest matrix density exceeds threshold | Packet filtering (inside-inside) | TCP filtering<br>Internet Protocol (IP) routing policy<br>Firewall |
| Portion of destination addresses without a business reason exceeds threshold<br>Portion of non-business outbound traffic exceeds the threshold | Packet filtering (inside-outside) | DNS filtering<br>IP routing policy<br>Firewall |
| Portion of destination addresses without a business reason exceeds threshold | Packet filtering (outside-inside) | Firewall |
| Packet loss exceeds threshold and entropy of data below the threshold | Data reduction (compression) | HTTP compression<br>Secure Socket Layer (SSL) compression<br>Layer 2/Layer 3 (L2/L3) data compression |
| Data redundancy over a period exceeds a threshold | Data reduction (caching) | HTTP caching<br>Content distribution caching<br>L2/L3 Forward Equivalent Class (FEC) overlay |
| Latency exceeds threshold | Latency compression (transport layer) | TCP splitting |
| VNF server exceeds capacity<br>VNF latency exceeds threshold | Additional VNF-compute resources | Deploy additional VNF of the same type (e.g. virtual routers or virtual SIP controllers, virtual MME) |
| Network measurement condition | Network measurement | VNF-based implementation |
| Existence of encryption | Internet Protocol Security (IPsec) headers<br>Increased entropy | L2/L3 encryption |
| Existence of compression | Lack of TCP/IP headers | HTTP compression<br>SSL compression<br>L2/L3 data compression |
| Existence of caching | Termination of requests before final destination | HTTP caching<br>Content distribution caching<br>L2/L3 FEC overlay |

Service Enhancement Identification Process

Figure 5:
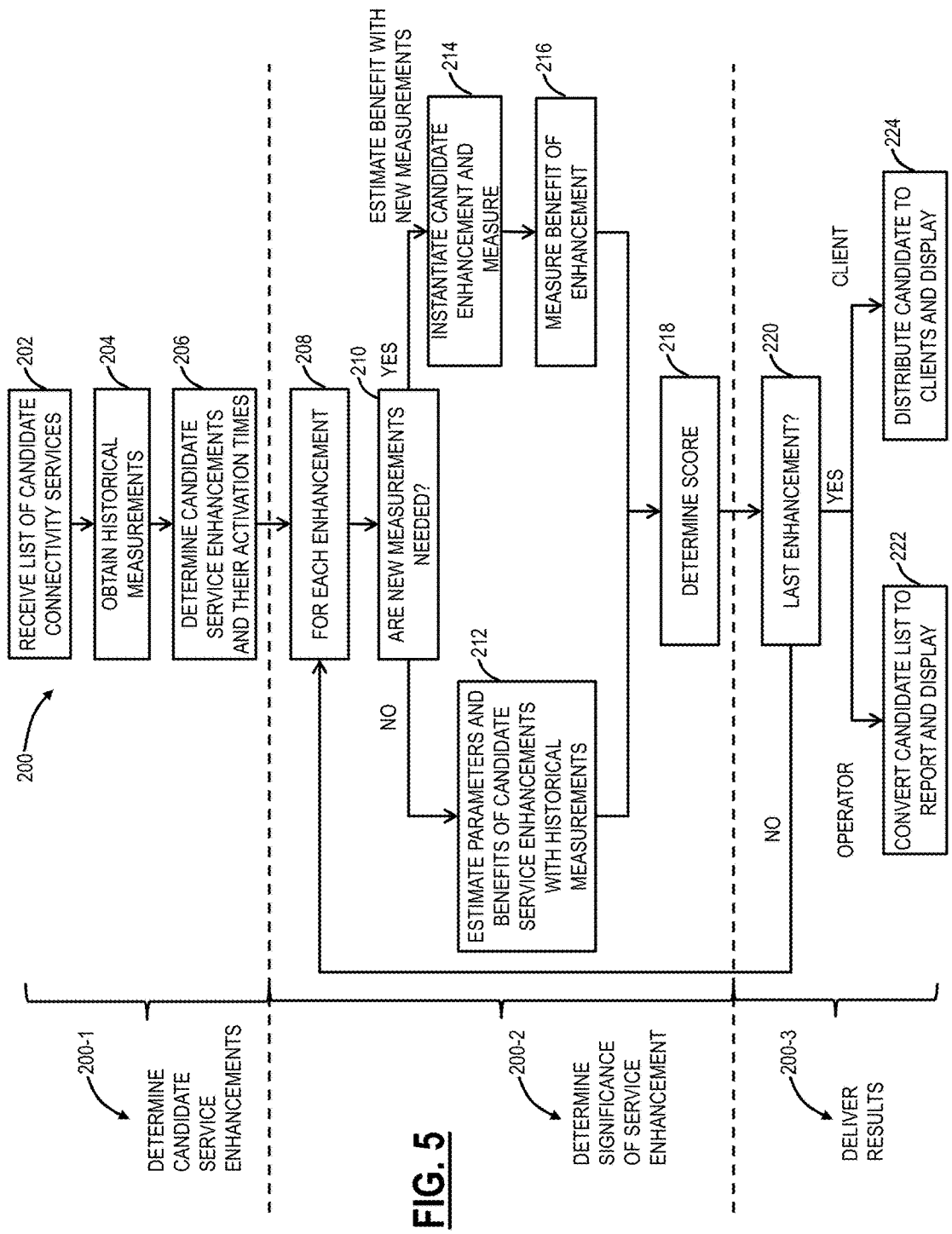
FIG. 5 is a flow chart of a detailed service enhancement identification process.

Referring to FIG. 5, in an exemplary embodiment, a flow chart illustrates a detailed service enhancement identification process 200. The process 200 contemplates the operation in the SDN network 10, such as through the engine 60. Also, the process 200 is similar to the processes 120, 140, providing additional details. A key aspect of the systems and methods is service enhancements discovery and recommendation. Again, the processes 120, 140, 200 first discover and create the candidate service enhancement list 64 for an active service and then rank the enhancements according to their incremental benefit to the client 16 and cost to the network operator 14. The input to the processes 120, 140, 200 is a list of candidate services, which can be provided by the CRM system 28. In the process 200, for illustration purposes, the service enhancements are described with reference to connectivity service enhancements. Those of ordinary skill in the art will recognize the process 200 could apply equally to VNF services or any other types of service enhancements.

The process 200 can be categorized into three sections—determining candidate service enhancements (section 200-1), determining a significance of each of the service enhancements (section 200-2), and delivering the results (section 200-3). For the section 200-1, the process 200 receives a list of candidate connectivity services (step 202), obtains historical measurements (step 204), and determines candidate service enhancements and their activation times (step 206). Given a list of candidate services, the process 200 proceeds to an in-depth analysis of past network measurements 56. Again, the network measurements 56 are provided by a network analytics engine, which collects measurements and determines an appropriate statistical representation for them. In step 206, the process 200 generates the candidate service enhancement list 64 for possible enhancements for some future times, based on forecasts of client's future or seasonal traffic's representative bandwidth (see, e.g., U.S. patent application Ser. No. 14/604,875 previously referenced above), packet loss, or latency. Packet loss and latency may be measured or estimated from the representative bandwidth or the like.

For the section 200-2, the process 200, for each enhancement (step 208), includes checking if new measurements are needed (step 210), and if not, includes estimating parameters and benefits of each of the candidate service enhancements with historical measurements (step 212). If an enhancement needs new measurements (step 210), the process 200 includes instantiating the candidate enhancement and measuring (step 214), and determining the benefit of the candidate enhancement (step 216). Finally, the process 200, in the section 200-2, includes determining the score for the candidate enhancement (step 218). The process 200 is configured to estimate the benefit of each enhancement. For some enhancements it may be possible to estimate the QoS benefit with a formula (i.e., in the step 212), while for others it may be necessary to activate an enhancement temporarily (i.e., in step 214). For example, a representative bandwidth forecast presents a clear way to determine the level of bandwidth required at future times to lower packet losses (see, e.g., U.S. patent application Ser. No. 14/604,875 previously referenced above). On the other hand, if the service exhibits a temporary packet loss due to saturated bandwidth each Tuesday afternoon, it may be difficult to determine the amount of bandwidth increase required without a clear idea of how high bandwidth usage really is. In this case, the process 200 may include enabling higher bandwidth for a period to determine the actual level required to prevent packet losses.

In step 218, the process 200 includes determining the score for each enhancement. To calculate the score, the process 200 may include calculating the revenue that can be obtained by adding the enhancement to the existing service (what the client 16 would pay for the enhancement) and the cost of adding the enhancement to the network 50 (additional hardware, lost opportunities for new business). The score is calculated using the enhancement benefits and its revenue and cost, according to the scoring policy associated with the client 16. The client 16 or the network operator 14 may set the scoring policy. The score may be calculated to maximize QoS, minimize network cost, maximize revenue, maximize profit, as desired by the network operator 14 or client 16 by setting the appropriate policy.

In the section 200-3, the process 200 finishes the section 200-2 after the last candidate enhancement is evaluated (step 220). The process 200 can include converting the candidate service enhancement list 64 to report and display to the network operator 14 (step 222) and distributing the candidate service enhancement list 64 to the associated clients 16 for display (step 224). The candidate service enhancement list 64 can be displayed through either of the portals 24, 26. Also, the candidate service enhancement list 64 can be saved in a database, emailed, etc. The portals 24, 26 may use enhancement scores to prioritize which enhancements are shown to the client 16 or the network operator 14. Note that since the candidate service enhancement list 64 is stored in a database, the CRM system 28 may use it for services which are not active at the time of a query, if, for example, a customer terminates a service and wishes to sign-up for it again.

Network Analytics for Connectivity Service Enhancements

Again, the network measurements 56 are used to assess the enhancement benefits of using a specific connectivity enhancement. The benefit of some enhancements is obtained by looking at past measurements with a simple look-up table. The benefit of other enhanced services may only be discovered after activating some new functionality in the network 50, such as with latency measurements with packet injection (ICPM, RFC2544, ITU Y.1564). Seasonality or trend of the measurements may be important, and on-demand services can be evaluated using seasonal averages to discover seasonality. Network measurements for determining appropriate connectivity enhancements can include any of:

---
Traffic volume for source-destination pair
Packet loss for source-destination pair
Latency for source-destination pair
Network interest matrix
any of the above with respect to a specific customer, Virtual Private Network (VPN), sub-network, link, path, etc.

---

Connectivity Service Enhancement Triggers and Possible Improvement Mechanisms

The following table illustrates current, forecast or seasonal traffic information with associated service enhancement and connectivity-based service enhancement. The table may be used during the process 200 identifying service enhancements (i.e., during the step 206). Further information may be required to determine exactly what the enhancement should do, when it should be active and for how long it should be active. Enabling a connectivity service enhancement may require changing provisioning on existing hardware equipment, parameters of which are decided (see the steps 212, 216).

| Current, forecast or seasonal information | Service enhancement | Connectivity based service enhancement |
|---|---|---|
| Utilization exceeds threshold | Load-balancing | Add alternate path for connection, use ECMP |
| Packet loss exceeds threshold | Packet loss reduction (bandwidth) | Increase bandwidth permanently |
| Utilization exceeds threshold | | Increase bandwidth on a schedule |
| | | Increase bandwidth-on-demand |
| Packet loss exceeds threshold | Packet loss reduction (inter-customer prioritization) | Increase customer QoS level permanently |
| | | Increase customer QoS level on a schedule |
| | | Increase customer QoS level on-demand |

-continued

| Current, forecast or seasonal information | Service enhancement | Connectivity based service enhancement |
|---|---|---|
| Packet loss of a customer exceeds threshold | Packet loss reduction (intra-customer prioritization) | Increase bandwidth permanently Increase bandwidth on a schedule Increase bandwidth-on-demand |
| Packet loss exceeds threshold Utilization exceeds threshold | Packet loss reduction (traffic segregation) | Alternative routing for specific traffic at the ingress point |
| Latency exceeds threshold Jitter exceeds threshold | Latency compression Jitter compression | Move traffic to a shorter path Increase bandwidth Move traffic to the path with lower utilization Move traffic to the path with lower utilization |

Examples of Connectivity Service Enhancements

Figure 11:
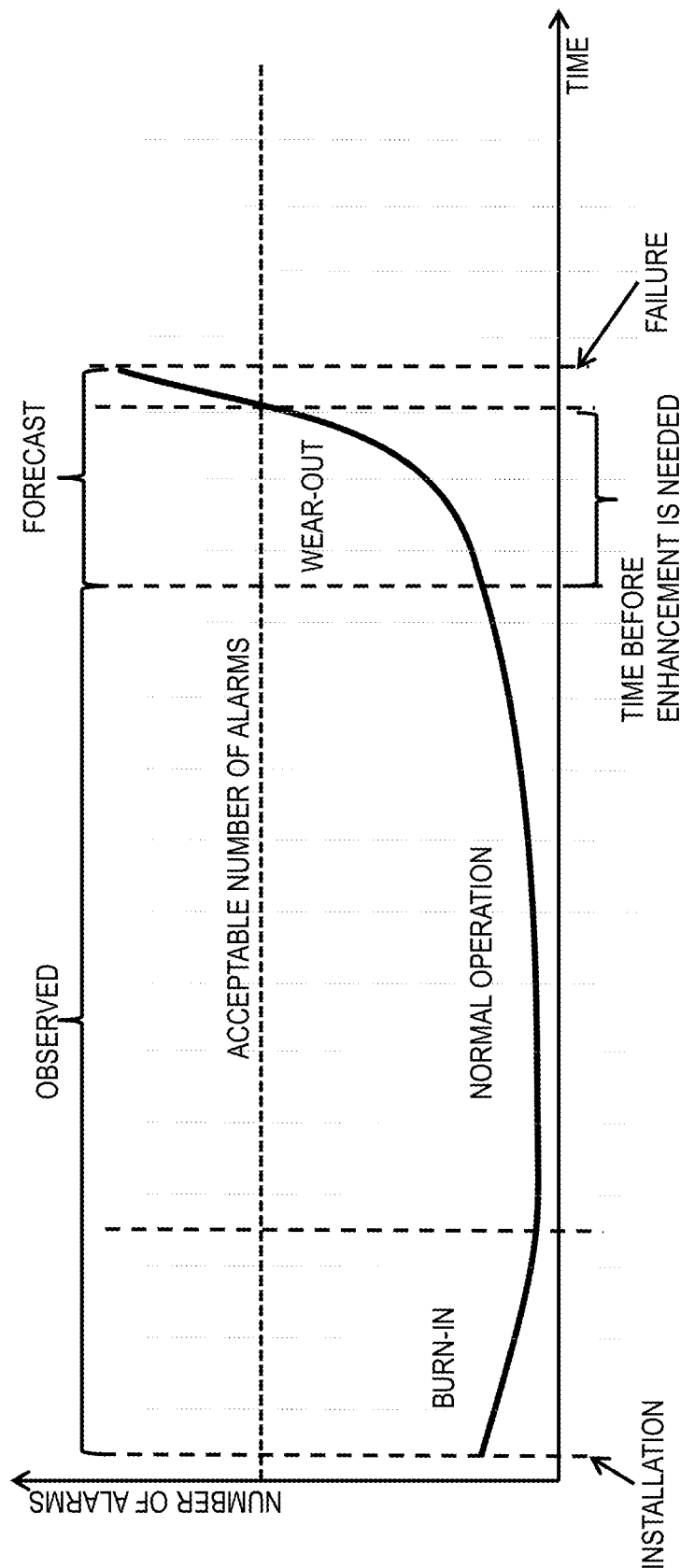
FIG. 11 is a graph of an example of a connectivity service enhancement including E6) increase or decrease protection level.
Figure 12:
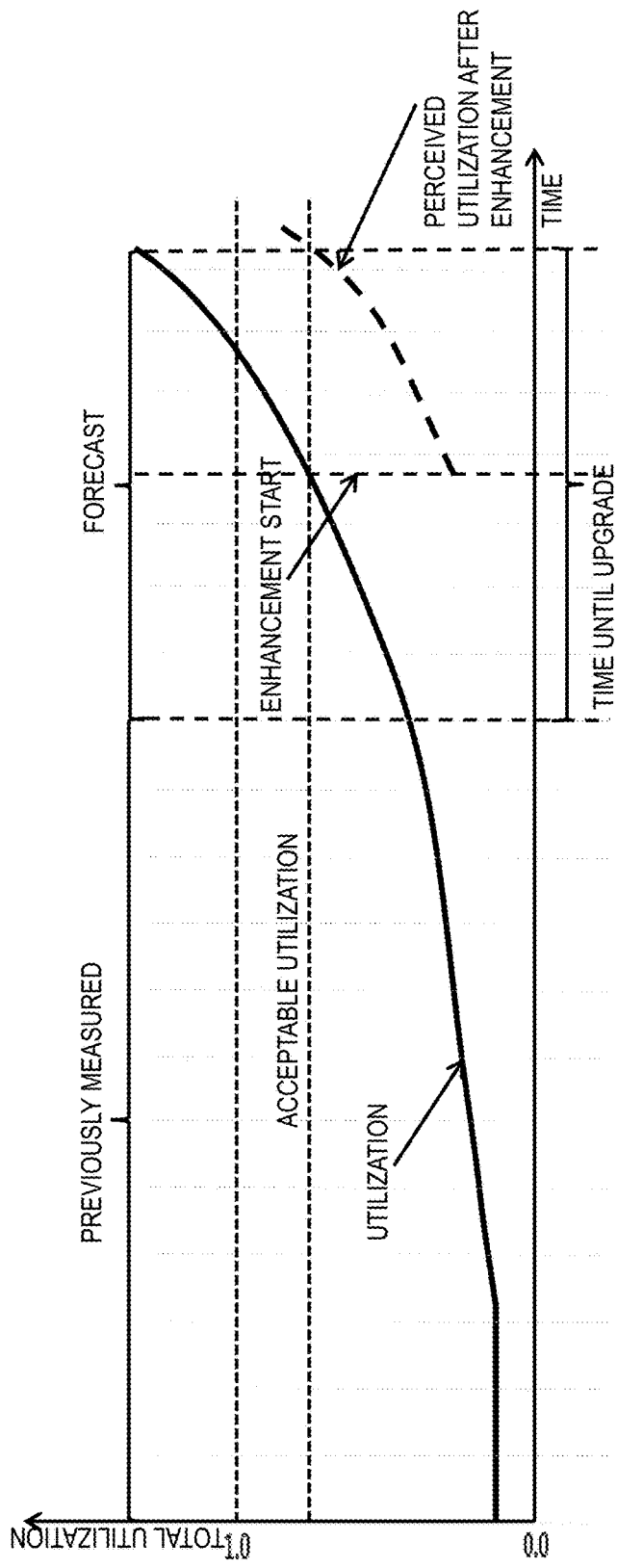
FIG. 12 is a graph of an example of a connectivity service enhancement including E7) increase or decrease QoS priority.

Referring to FIGS. 6-12, in various exemplary embodiments, graphs and flow charts illustrate examples of the connectivity service enhancements including E1) increase or decrease bandwidth (FIG. 6), E2) change from static bandwidth to on-demand usage (FIG. 7), E3) increase or decrease bandwidth with a calendar (FIG. 8), E4) adjust a calendar (FIG. 9), E5) re-route (FIG. 10), E6) increase or decrease protection level (FIG. 11), E7) increase or decrease QoS priority (FIG. 12).

Figure 6:
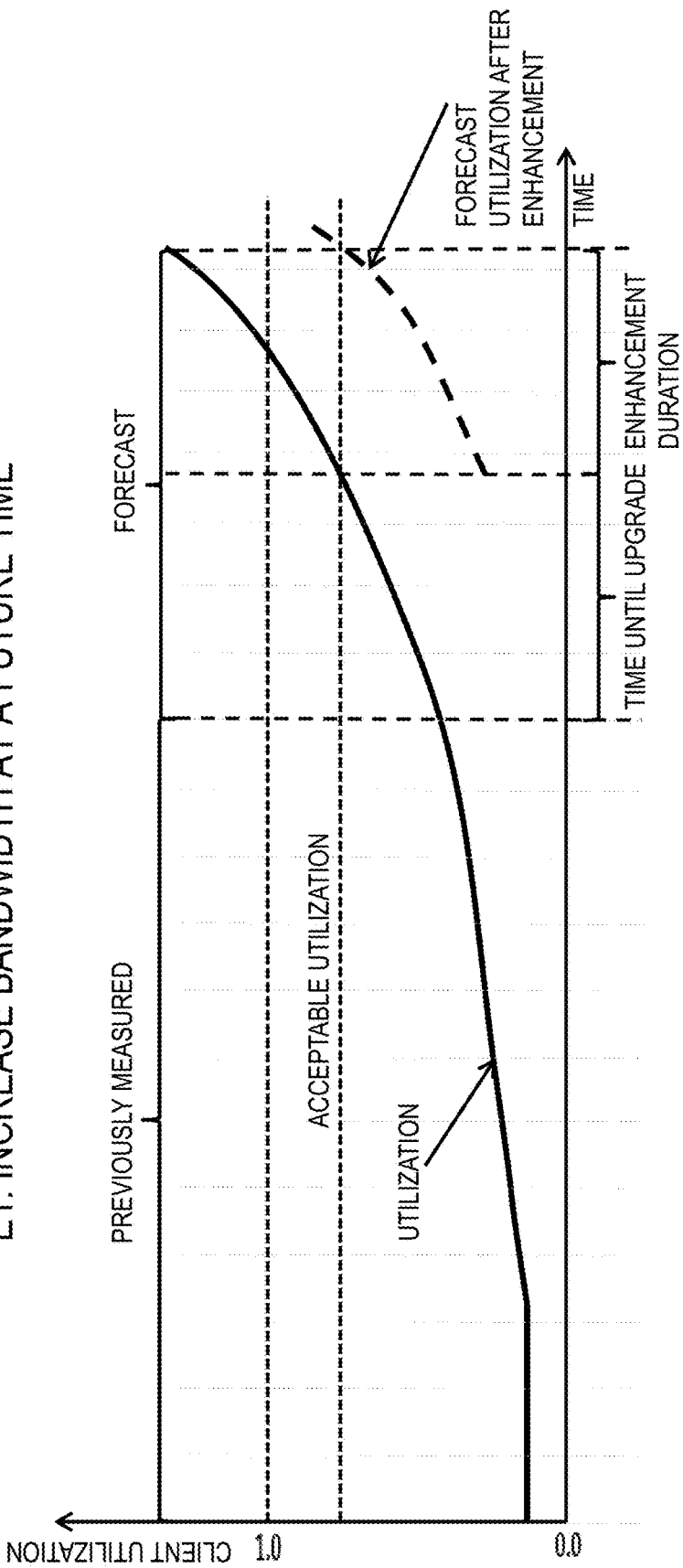
FIG. 6 is a graph of an example of a connectivity service enhancement including E1) increase or decrease bandwidth.

Examples of Connectivity Service Enhancements—E1) Increase or Decrease Bandwidth FIG. 6 is a graph showing an increase in bandwidth at a future time. The graph in FIG. 6 shows client utilization over time, including previously measured utilization and a forecast of future utilization. The measured bandwidth can be used to forecast future bandwidth (possibly using a representative bandwidth (see, e.g., U.S. patent application Ser. No. 14/604,875 previously referenced above)). The utilization is calculated from bandwidth and capacity and used to determine when excessive packet losses may occur (e.g., an 80% utilization threshold may be the acceptable utilization). The utilization forecast is obtained from bandwidth forecast. The duration of the enhancement is chosen (may be input into the process). Using the duration, a required bandwidth increase level is determined so that utilization is not crossed again during the valid time of the enhancement. The cost of the enhancement is any additional hardware required to support the future bandwidth.

Figure 7:
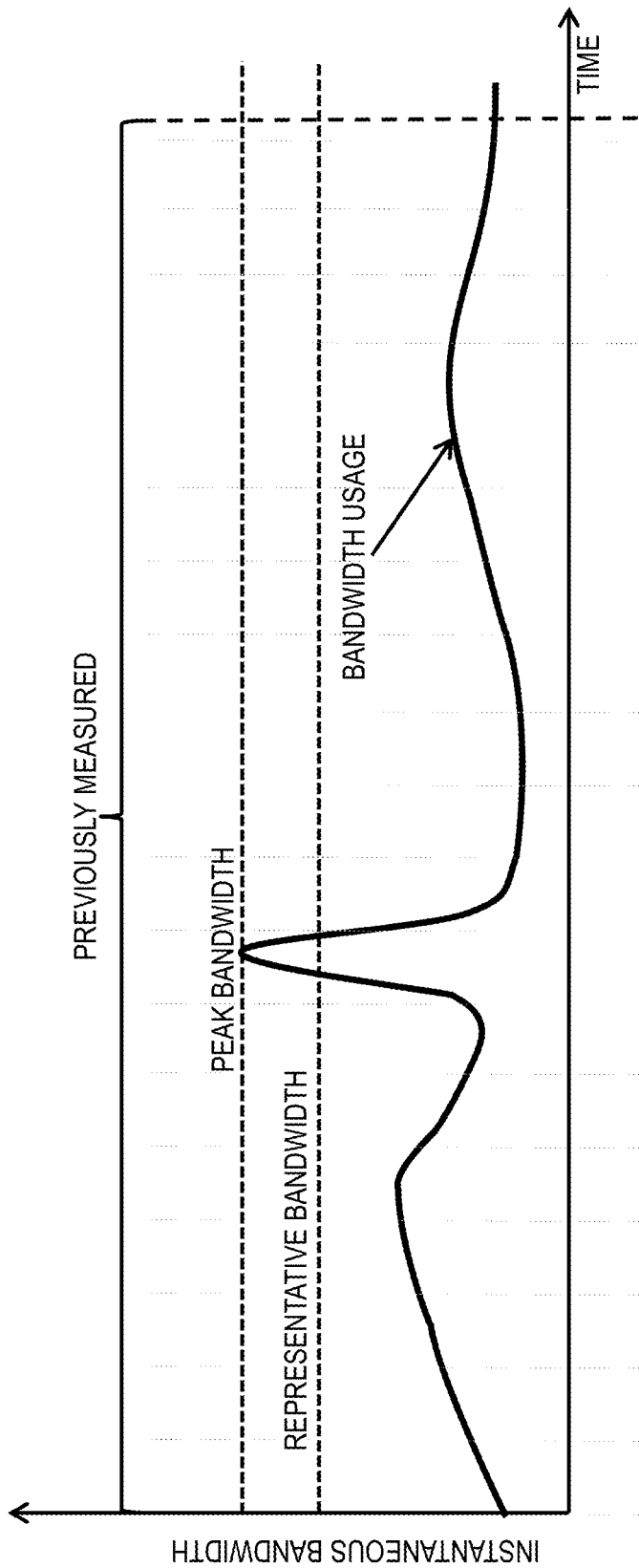
FIG. 7 is a graph of an example of a connectivity service enhancement including E2) change from static bandwidth to on-demand usage.

Examples of Connectivity Service Enhancements—E2) Change from Static Bandwidth to on-Demand Usage FIG. 7 is a graph showing instantaneous bandwidth over time to illustrate a change from static bandwidth to on-demand usage. Again, the measured bandwidth is used to determine the representative bandwidth for the connection (e.g., a 90% envelope) (see, e.g., U.S. patent application Ser. No. 14/604,875 previously referenced above). For example, an on-demand tariff can be set so that:

[representative bandwidth]*[on-demand tariff]+([static bandwidth]−[representative bandwidth])*
[expected on-demand revenue]>(static tariff)

where static bandwidth is the current bandwidth purchased by the customer and expected on-demand revenue is the rate of revenue expected to be received from the freed-up resources. If on-demand tariff can be set so that the network operator 14 can replace the lost fee with an on-demand fee, on-demand usage model is recommended to the client 16.

Figure 8:
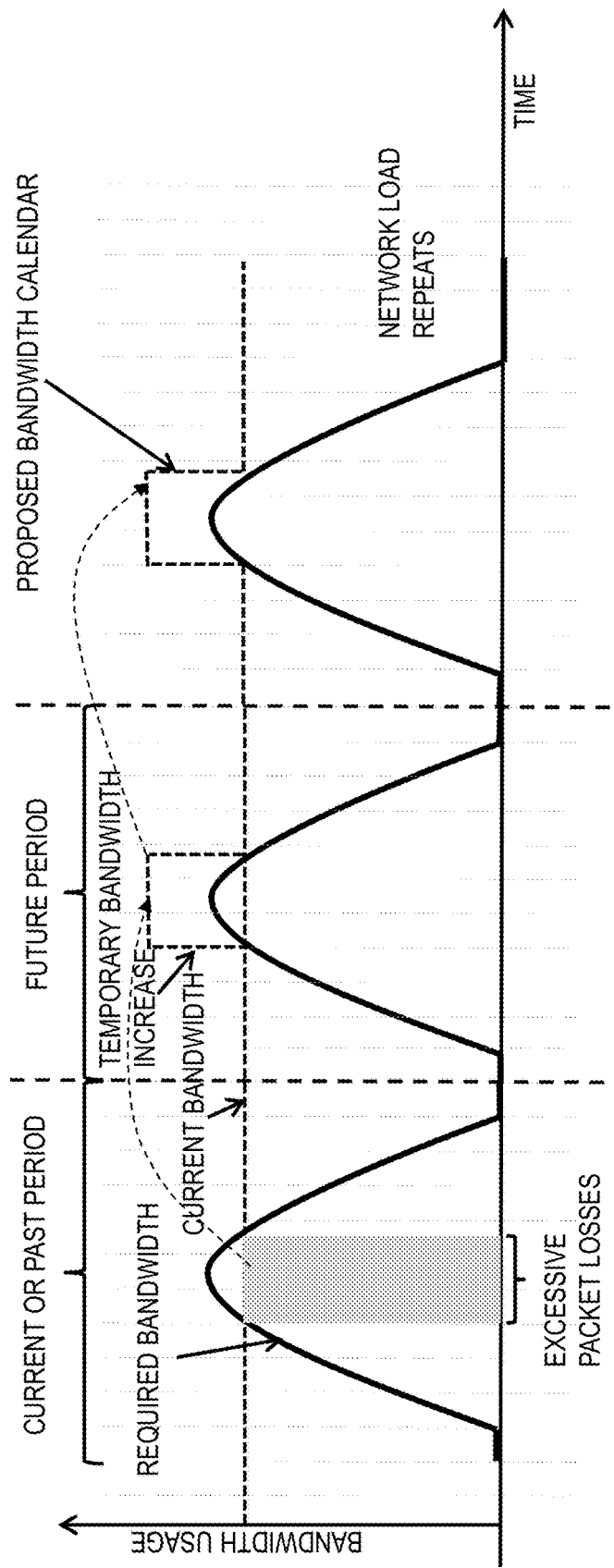
FIG. 8 is a graph of an example of a connectivity service enhancement including E3) increase or decrease bandwidth with a calendar.

Examples of Connectivity Service Enhancements—E3) Increase or Decrease Bandwidth with a Calendar FIG. 8 is a graph of bandwidth usage over time to illustrate the increase or decrease bandwidth with a calendar. The network measurements 56 are used to detect times when packet losses are too high, taking seasonality into consideration. Using a seasonal forecast of the utilization (when it is less than 1.0), it is possible to determine required bandwidth for calendared bandwidth (see E1). If the utilization is 1.0, the actual bandwidth usage is not known, and the processes can include initiating a temporary bandwidth increase in next seasonal period. If the bandwidth increase is enough to contain no or substantially no packet losses, the bandwidth is used to propose a calendar enhancement to the client 16.

Examples of Connectivity Service Enhancements—E4) Adjust a Calendar

Figures 9, 10:
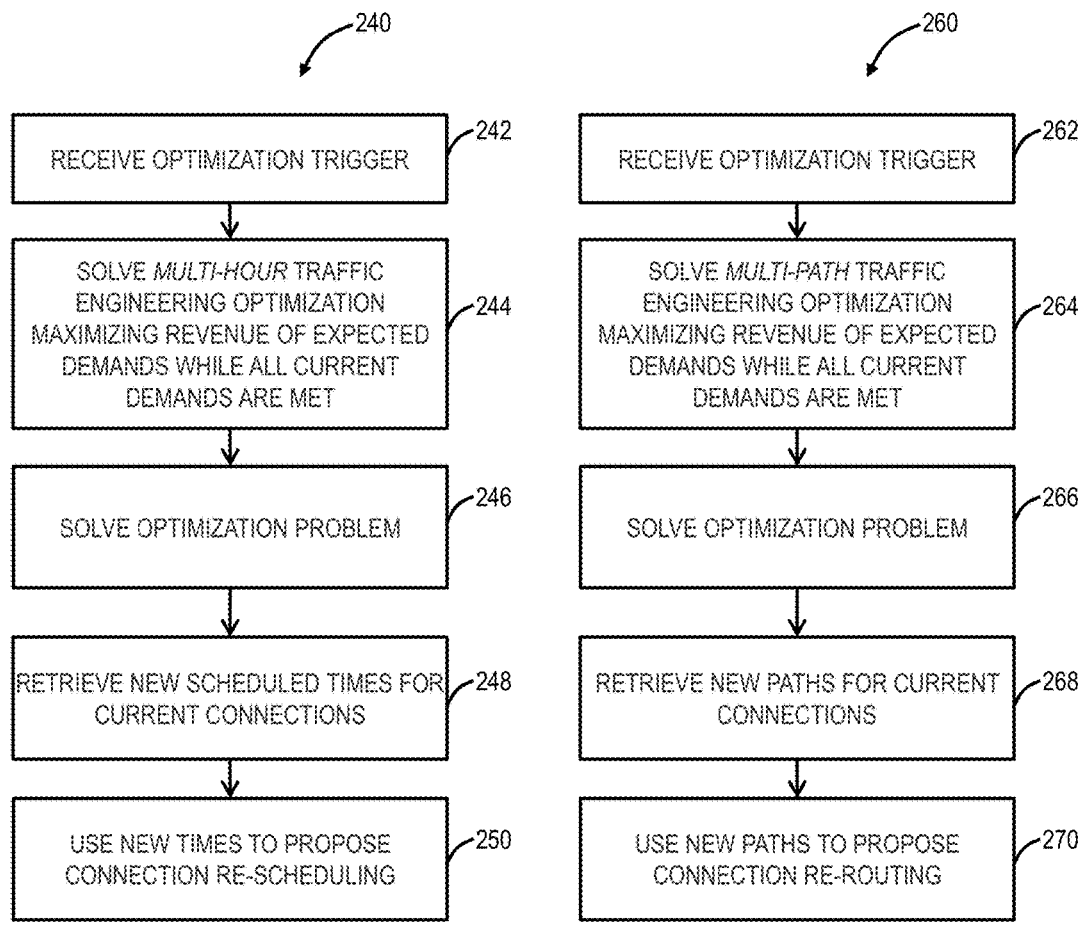
FIG. 9 is a flow chart of an example of a connectivity service enhancement including E4) adjust a calendar.
FIG. 10 is a flow chart of an example of a connectivity service enhancement including E5) re-route.

FIG. 9 is a flow chart of a calendar adjustment process 240. The process 240 includes receiving an optimization trigger (step 242), solving multi-hour traffic engineering optimization to maximize revenue of expected demands while all current demands are met (step 244), solving an optimization problem (step 246), retrieving new scheduled times for current connections (step 248), and using the new times to propose connection re-scheduling (step 250). The optimization can be triggered by a network event, such as an end of network defragmentation, which freed-up new paths, a change in network demands, etc. The optimization finds the policy with the maximum utility. The optimization can be a linear or convex multi-commodity flow optimization maximizing expected revenue over multiple time periods. An estimate of connection arrivals in each period is needed to formulate optimization. The goal of the optimization is to move current movable connections into times of the network 50 is not expected to be used by more valuable connections.

The optimization can be formulated using well-known approaches such as a multi-hour optimization formulation: M. Pioro, D. Medhi, "Routing, Flow, and Capacity Design in Communication and Computer Networks", Morgan Kaufmann Publishers Inc. San Francisco, Calif., USA 2004; a revenue optimization formulation: D. Bertsimas, I. Popescu, "Revenue Management in a Dynamic Network Environment", Transportation Science, Vol. 37, No. 3, August 2003; etc. The output of the optimization is the amount of traffic reserved for each connection in each time interval. The optimization may be formulated to keep the routes the same or to re-route connections. The difference between current allocations and the new allocations is sufficient information to obtain the candidate service enhancement list 64 (new calendar times for existing movable connections).

Examples of Connectivity Service Enhancements—E5) Re-Route

FIG. 10 is a flow chart of a re-route process 260. Similar to the process 240, the process 260 includes receiving an optimization trigger (step 262), solving multi-path traffic engineering optimization to maximize revenue of expected demands while all current demands are met (step 264), solving an optimization problem (step 266), retrieving new paths for current connections (step 268), and using the new paths to propose connection re-routing (step 270). The optimization can be triggered by a network event, such as an end of network defragmentation, which freed-up new paths, a change in network demands, etc. The optimization finds the policy with the maximum utility. The optimization can be a linear or convex multi-commodity flow optimization maximizing expected revenue over multiple time periods. An estimate of connection arrivals in each period is needed to formulate optimization. The goal of the optimization is to move current movable connections into times of the network 50 is not expected to be used by more valuable connections.

The optimization can be formulated using well-known approaches such as a multi-hour optimization formulation: M. Pioro, D. Medhi, "Routing, Flow, and Capacity Design in Communication and Computer Networks", Morgan Kaufmann Publishers Inc. San Francisco, Calif., USA 2004; a revenue optimization formulation: D. Bertsimas, I. Popescu, "Revenue Management in a Dynamic Network Environment", Transportation Science, Vol. 37, No. 3, August 2003; etc. The output of the optimization is the amount of traffic reserved for each connection in each time interval. The optimization may be formulated to keep the routes the same or to re-route connections. The difference between current allocations and the new allocations is sufficient information to obtain the candidate service enhancement list 64 (new routes for existing movable connections).

Examples of Connectivity Service Enhancements—E6) Increase or Decrease Protection Level FIG. 11 is a graph illustrating a number of alarms over time to show an increase or decrease in protection level. The observed alarm rate is measured and used to forecast future alarm rate using a parametric method (i.e., curve fitting to the "bathtub" curve) such as Edmund A. Gehan, M. M. Siddiqui, "Simple Regression Methods for Survival Time Studies", Journal of the American Statistical Association, Vol. 68, Iss. 344, 1973. The goal of the forecast is to determine the time when the failure rate exceeds a threshold so that dedicated protection can be added to the connection. An acceptable number of alarms and the required time before predicted failure can be used to determine when the extra protection should be recommended. A process can be performed on link-by-link or node-by-node basis and extended to multi-hop and network scenarios using and logic with thresholds on number of alarms ($link_1$<threshold AND $link_2$<threshold).

Examples of Connectivity Service Enhancements—E7) Increase or Decrease QoS Priority FIG. 12 is a graph of total utilization over time illustrating an increase or decrease in QoS priority at a future time or with a calendar. Again, the measured bandwidth is used to forecast future bandwidth (possibly using a representative bandwidth) (see, e.g., U.S. patent application Ser. No. 14/604,875 previously referenced above). Utilization is calculated from bandwidth and capacity and used to determine when excessive packet losses may occur (i.e. 80% utilization threshold). A utilization forecast can be obtained from bandwidth forecast. The duration of the enhancement is chosen (may be input into the procedure) based on how long it may take to upgrade the network and meet the utilization target (i.e. less than 80%). Using the time until the upgrade, the required QoS priority level is determined, so that perceived utilization (with the increased QoS level) is not crossed again before the upgrade. The cost of the enhancement is any additional hardware required to support the future bandwidth.

Portal-Based Service Enhancement Discovery and Recommendation

Figure 13:
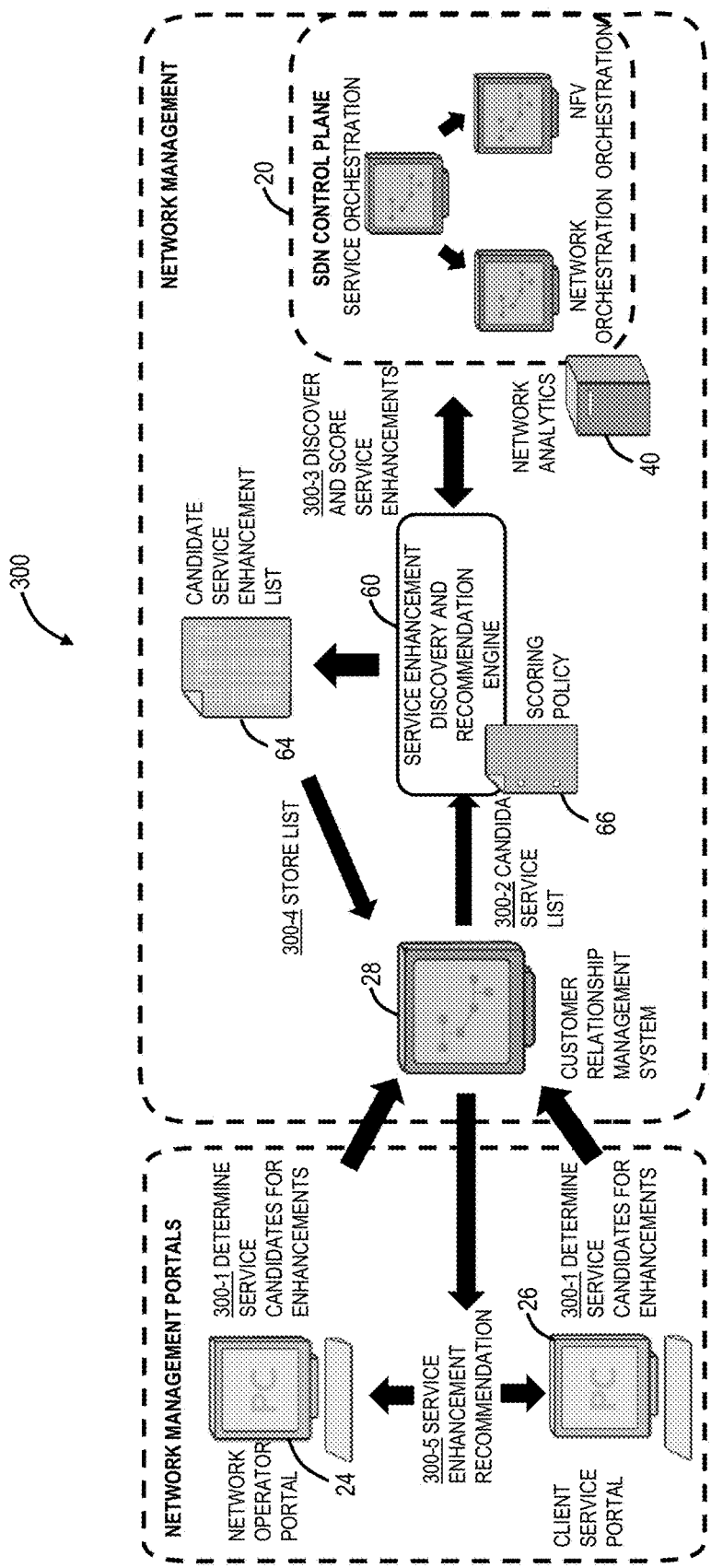
FIG. 13 is a flow diagram of a portal process 300, with reference to various components in the SDN network of FIG. 1.

Referring to FIG. 13, in an exemplary embodiment, a flow diagram illustrates a portal process 300, with reference to various components in the SDN network 10. An important aspect of the systems and methods is to convey the service enhancement costs and benefits to the operator 14 and the client 16. For the operator 14 to make additional revenue or profit, it is necessary that clients 16 are offered service enhancements at a higher fee or a lower operating cost, compared to their current services. Clients 16 need to understand the impact of the enhancement on their QoS or QoE before they agree to pay more for value-added services. As described herein, the systems and methods include the portals 24, 26 for the network operators 14 and clients 16. The portals 24, 26 can communicate with the CRM system 28, which can initiate connectivity service enhancement discovery and recommendation, based on portal 24, 26 actions. The portals 24, 26 have two main purposes: (1) to produce the candidate service enhancement list 64, which may benefit from enhancements, based on explicit user requests or by inference from user's actions in the service portal 26; (2) to display a report to the network operator 14 or sales push to the network clients 16.

The portal process 300 illustrates the various interaction between components in the SDN system 10. The network portal 24 or the service portal 26 can determine service candidates for enhancements and provide to the CRM system 28 (step 300-1). The CRM system 28 can provide a candidate service list to the engine 60 (step 300-2) and the engine 60 can use the scoring policy 66 to derive the candidate service enhancement list 64 through discovering and scoring the service enhancements with the SDN control plane 20 (step 300-3). The candidate service enhancement list 64 can be stored in the CRM system 28 (step 300-4). The CRM system 28 can provide the candidate service enhancement list 64 to the portals 24, 26 (step 300-5).

The clients 16 or the network operators 14 can use the portals 24, 26 to receive service enhancement recommendations. Again, recommendations may be requested explicitly (by clients 16 or network operators 14) as well as offered while the clients 16 are using the portal 26 for configuration or monitoring of their network services 54. The CRM system 28 communicates with the portals 24, 26 and provides the information required for the service enhancement recommendations. The CRM system 28 may provide the portals 24, 26 through a website or an application layer server. Before passing enhancement recommendations to the portal, the CRM system 28 may filter them based on the score and the CRM system 28 tracks which scoring policies are in effect for each client 16 or network operator 14.

The service enhancement discovery and recommendation engine 60 determines which services can be enhanced, how they can be enhanced and provides a score for each candidate enhancement. The engine 60 works with the SDN control plane 20 to obtain service information, performance statistics or to enable testing of network performance or testing of service enhancements. The score is calculated based on the policy associated with the owner of the service or based on explicit policy input. Note that the portals 24, 26 could be provided directly by the service enhancement discovery and recommendation engine 60, which would then query the CRM system 28 for appropriate information, or through a combined CRM system and discovery recommendation engine (i.e., a combination of the CRM system 28 and the engine 60).

Service Enhancement Identification Process for Service Portal

Figures 14, 15:
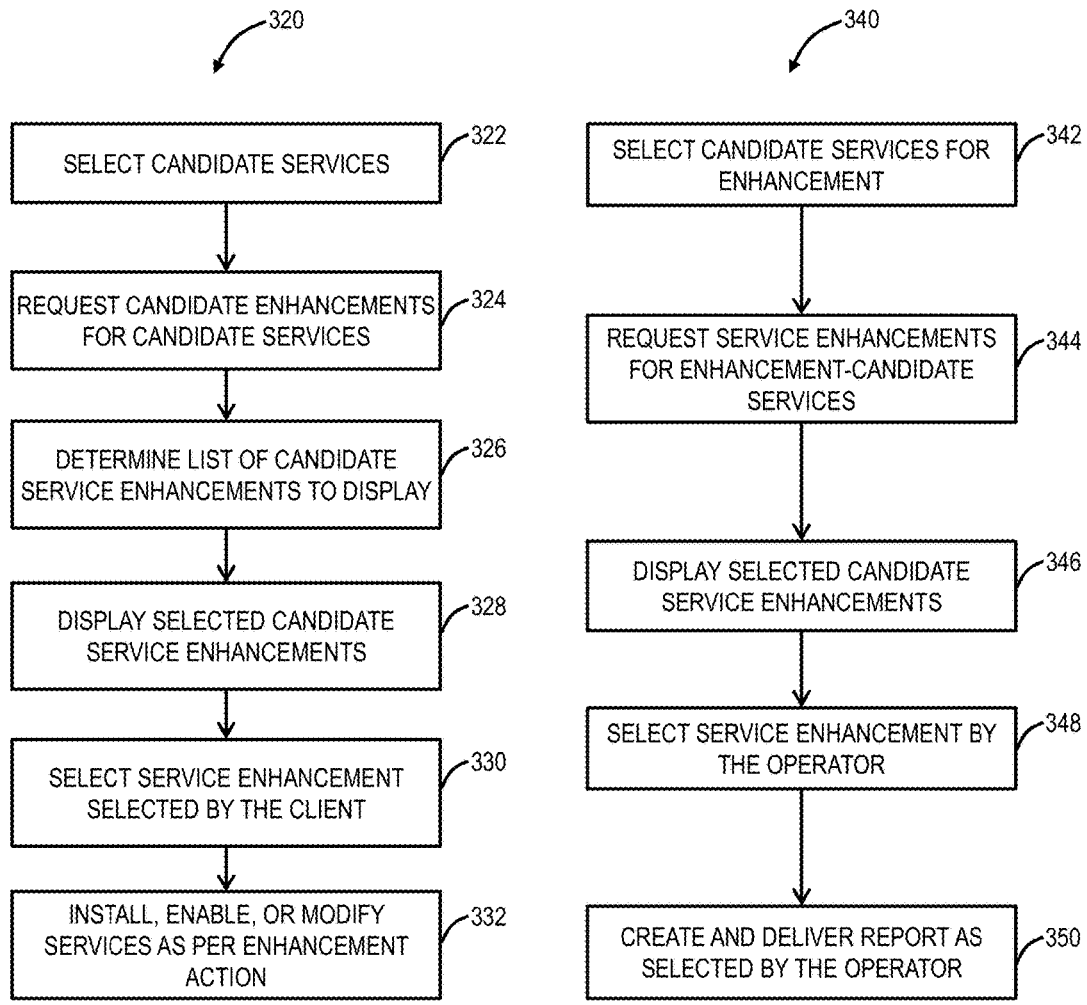
FIG. 14 is a flow chart of a service enhancement identification process for the service portal in the SDN network of FIG. 1.
FIG. 15 is a flow chart of a service enhancement identification process for the network portal in the SDN network of FIG. 1.

Referring to FIG. 14, in an exemplary embodiment, a flow chart illustrates a service enhancement identification process 320 for the service portal 26. The process 320 contemplates the operation through the service portal 26 with the various components and functionality described herein. The process 320 includes selecting candidate services (step 322), requiring candidate enhancements for the candidate services (step 324), determining a list of candidate service enhancements to display (step 326), displaying the selected candidate service enhancements (step 328), selecting a service enhancement selected by the client (step 330), and installing, enabling, or modifying network services per the selected enhancement action (step 332).

The service portal 26 can include a Graphical User Interface (GUI), which allows the client 16 or the operator 14 to accomplish certain network management tasks. For example, the portal 26 may be implemented as a series of screens, which are a part of a procedure performed by the client 16 or the operator 14 (e.g., a wizard). Before starting the process 320, the client 16 or the operator 14 are authenticated and to log into the portal 26. Service enhancement identification can be a stand-alone procedure, which displays the list of enhancements as a last step. Service enhancement identification may be triggered during a procedure performed by the user. For example, a user may be debugging an access issue related to a specific network application or network, in general.

The candidate service enhancement list 64 can be determined based on context. The client 16 may select a subset of client services through the portal 26. Client services may also be selected based on the current state of the portal 26, by for example selecting services, which are currently observed in the portal 26. Selected candidate services for the enhancement are passed to the network management systems, such as the SDN control plane 20, to obtain candidate service enhancements. Candidate service enhancements are returned with a cost, score, and a list of actions. The score may have a time dimension (i.e. a score may be based on forecast traffic patterns or seasonal traffic patterns). The score may have a QoS dimension, indicating how much a service is improved for a given enhancement. Actions for service enhancements are a list of tasks required to activate the service enhancements. The cost reflects the incremental price that the network 50 expects the client 16 to pay for the enhanced service (note that the cost may be negative indicating that the client 16 would pay less with the enhancement. The portal 26 displays the services to the client 16 in order for the client 16 to select and approve which service enhancements to upgrade to. Displayed service enhancements may be prioritized based on the score or the cost. For each service enhancement, the client 16 may be given information about the cost and benefits of the service. The client 16 may be offered a mechanism to enable the service.

Service Enhancement Identification Process for Network Portal

Referring to FIG. 15, in an exemplary embodiment, a flow chart illustrates a service enhancement identification process 340 for the network portal 24. The process 340 contemplates the operation through the service portal 26 with the various components and functionality described herein. The process 340 includes selecting candidate services for enhancement (step 342), requesting service enhancements for enhancement-candidate services (step 344), displaying the selected candidate service enhancements (step 346), selecting service enhancements by the operator 14 (step 348), and creating and delivering a report as selected by the operator 14 (step 350).

The network portal 24, similar to the portal 26, can be implemented as a GUI, which allows the operator 14 to accomplish certain network management or maintenance tasks. The network portal 24 may be implemented as a series of screens, which are a part of a procedure performed by the operator 14 (e.g., a wizard). The network portal 24 may be used exclusively for the purposes of obtaining service enhancement candidates for a desired set of clients 16.

The enhancement-candidate services are determined based on the context or selected by the network operator 14. The enhancement-candidate services may be chosen based on the network view if, for example, the network operator 14 is debugging the network 50 through the portal 24. The network operator 14 may also select specific clients 16 based on some criteria. The network portal 24 may select a subset of clients 16 and their services based on the geographical area or business reasons. The client services may also be selected based on the current state of the portal, by for example selecting services, which are currently observed in the portal 24.

Selected candidate services for the enhancement are passed to the SDN control plane 20 to obtain candidate service enhancements. The candidate service enhancements are returned with a cost, score, and a list of actions. The score may have a time dimension (i.e. a score may be based on forecast traffic patterns or seasonal traffic patterns). The score may have a QoS dimension, indicating how much a service is improved for a given enhancement. Actions for service enhancements are a list of tasks required to activate the service enhancements. The cost reflects the incremental price that the network 50 expects the client to pay for the enhanced service. The portal 24 displays the services to the operator 14 in order for the operator 14 to select and approve which services. Displayed service enhancements may be prioritized based on the score, revenue, or the cost.

Exemplary Portal Screens

Figure 16:
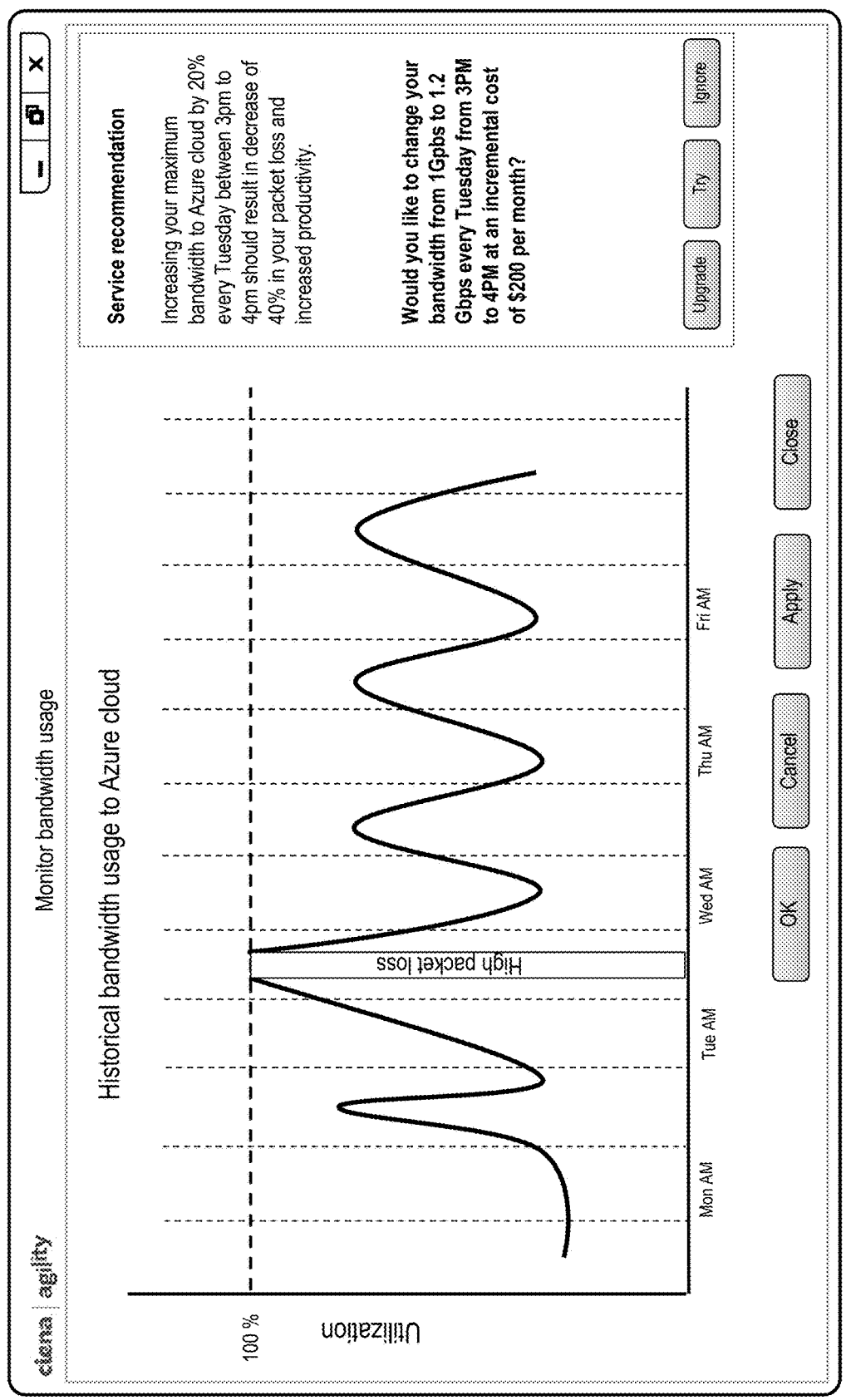
FIG. 16 is a screen shot/GUI of a bandwidth service recommendation through the portals in the SDN network of FIG. 1.
Figure 17:
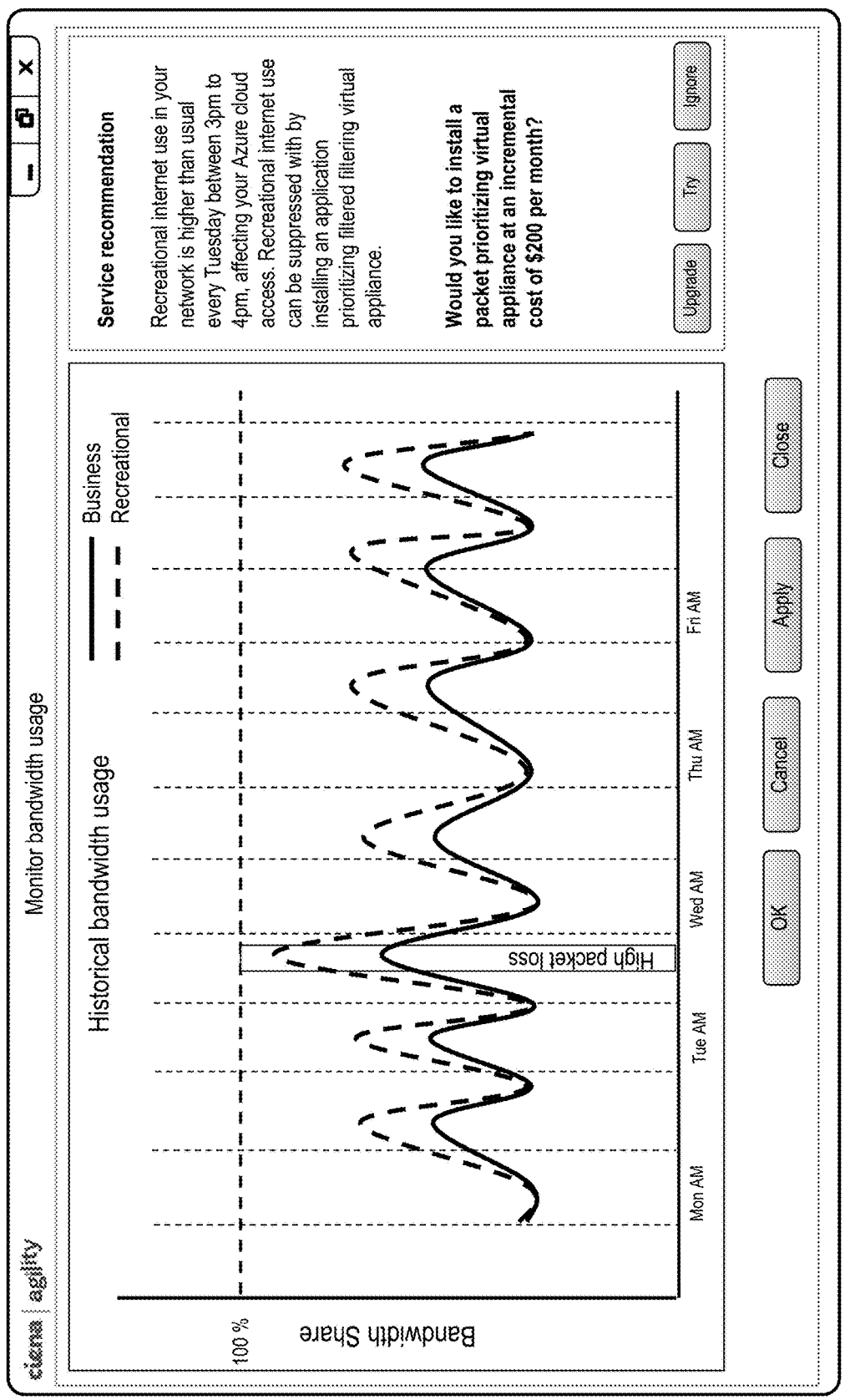
FIG. 17 is a screen shot/GUI of a VNF service enhancement recommendation through the portals in the SDN network of FIG. 1.
Figure 18:
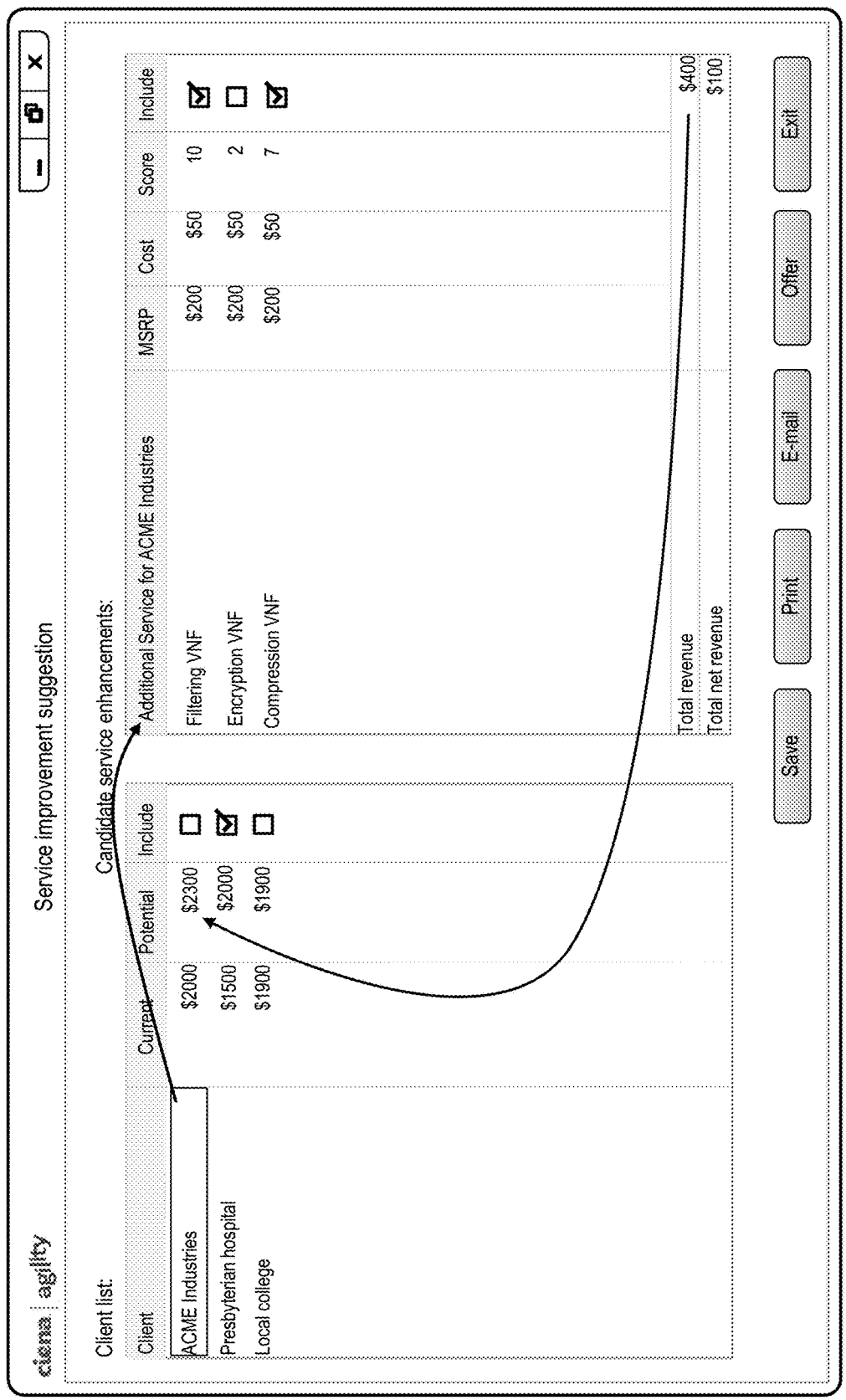
FIG. 18 is a screen shot/GUI of suggestions for VNF service enhancements through the portals in the SDN network of FIG. 1.
Figure 19:
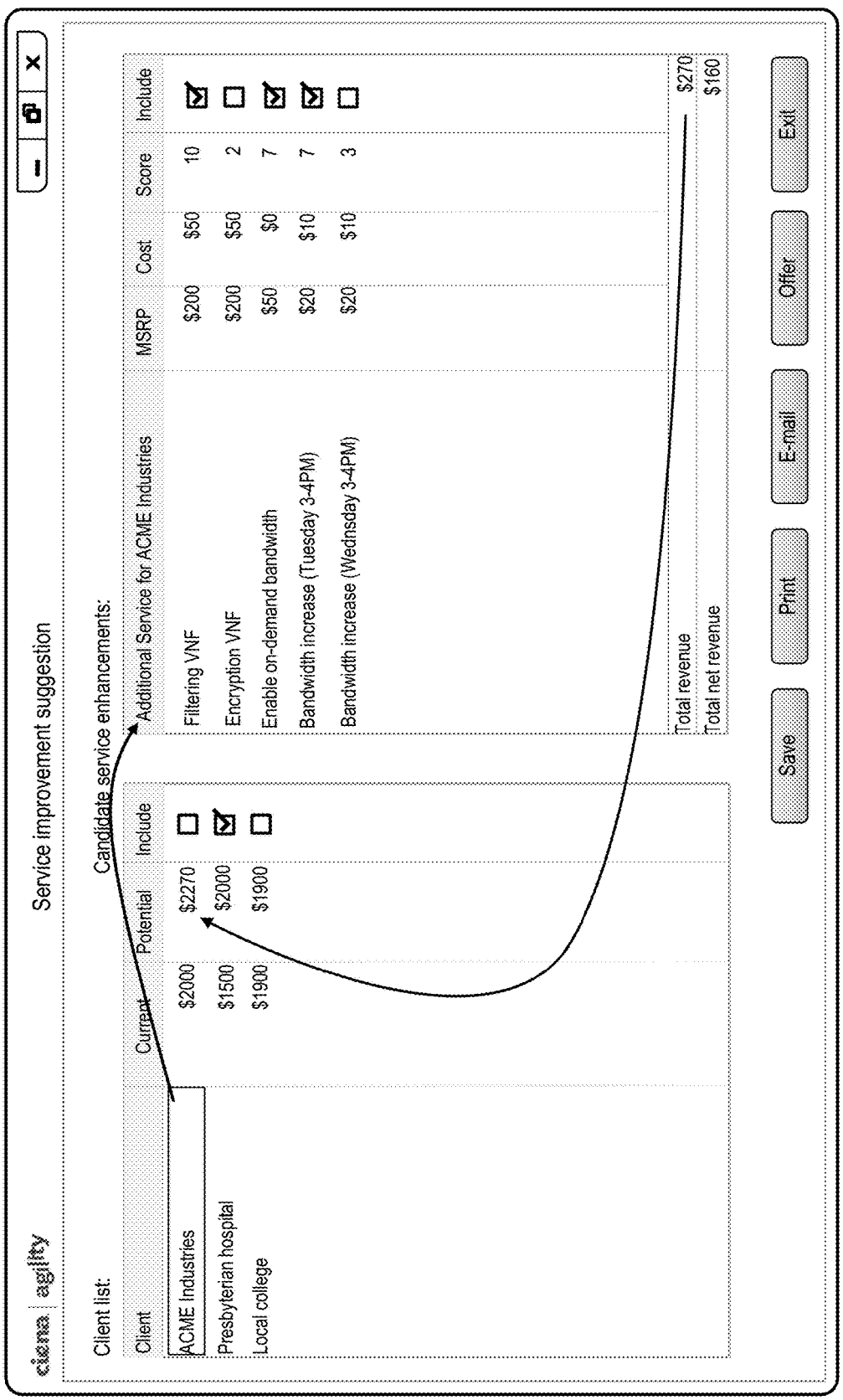
FIG. 19 is another screen shot/GUI of suggestions for VNF service enhancements through the portals in the SDN network of FIG. 1.

Referring to FIGS. 16-19, in various exemplary embodiments, screen shots illustrate various portal screens from the portals 24, 26. FIG. 16 is an example GUI with a bandwidth service recommendation, FIG. 17 is an example GUI with a VNF service enhancement recommendation and FIGS. 18 and 19 are example GUIs with suggestions for VNF service enhancements.

In FIG. 16, the circumstance is that the client 16 has discovered through user complaints that Tuesday afternoons are pretty bad for access to the Azure cloud. While the client 16 is looking at the past information about bandwidth usage, the portal 24, 26 requests that the engine 60 find out if the service can be improved, based on the information displayed to the customer (i.e. time-range, destination address). The engine 60 returns a possible improvement by increasing the bandwidth usage for a short-time on Tuesday afternoon, and the information required for the client 16 to make an informed decision about the service, e.g., changing bandwidth from 1 Gbps to 1.2 Gbps every Tuesday from 3-4 pm for an incremental charge of $200/mo.

In FIG. 17, similar to FIG. 16, the circumstance is that the client 16 has discovered through user complaints that Tuesday afternoons are pretty bad for access to the Azure cloud. While the client 16 is looking at the past information about bandwidth usage by traffic type, the portal 24, 26 requests that the engine 60 find out if the service can be improved, based on the information displayed to the client 16 (i.e. time-range, destination address, traffic type). The engine 60 returns a possible improvement by prioritizing traffic, which may cause unwanted "recreational traffic" to be limited during peak hours, e.g., installing a packet prioritizing virtual appliance/VNF for $200/mo.

In FIGS. 18 and 19, a service improvement suggestion GUI lists clients 16, showing current revenue and potential revenue, based on the service enhancement recommendations. This can be through the network portal 24, and the operator 14 can click on any client to drill down to show additional recommended services, price (MSRP), cost, and score. In FIG. 18, the client 16 ACME Industries can use VNFs for filtering, encryption, and compression. In FIG. 19, the client 16 ACME Industries can use VNFs for filtering and encryption as well and enabling on-demand bandwidth and specific bandwidth increases at certain times.

Network Management Process for Service Enhancement Identification

Referring to FIGS. 20 and 21, in exemplary embodiments, flow charts illustrate network management processes 400, 410 for service enhancement identification. The processes 400, 410 are similar, with the process 400 for VNF service enhancements and the process 410 for connectivity enhancements, with the difference being in the measurements. The processes 400, 410 include receiving an enhancement-candidate service list (step 412) and performing enhancement discovery and recommendation (step 414). The step 414 includes obtaining network measurements (step 416) which for the process 400 can include network and DPI measurements (step 416A) and for the process 410 can include obtaining past network measurements (step 416B). The step 414 further includes determining service enhancements and their benefit (step 418) which for the process 400 can include determining candidate VNF service enhancements and their benefit (step 418A) and for the process 410 can include determining connectivity service enhancements and their benefit (step 418B). The step 414 can finally include determining a score for each service enhancement (step 420). Finally, the processes 400, 410 can include transferring the service enhancements to the portals 24, 26 (step 422).

The network management processes 400, 410 are similar to the main processes described herein except that the list of candidate services is input from the portal 24, 26. The generated list is transferred to the portal to display to the user or generate a report. Communication between the terminal and the portal may be accomplished through network protocols (e.g., Representational State Transfer (REST) API), remote procedure calls, local procedure calls, etc.

Service Enhancement Detection and Recommendation with Portal

Figure 22:
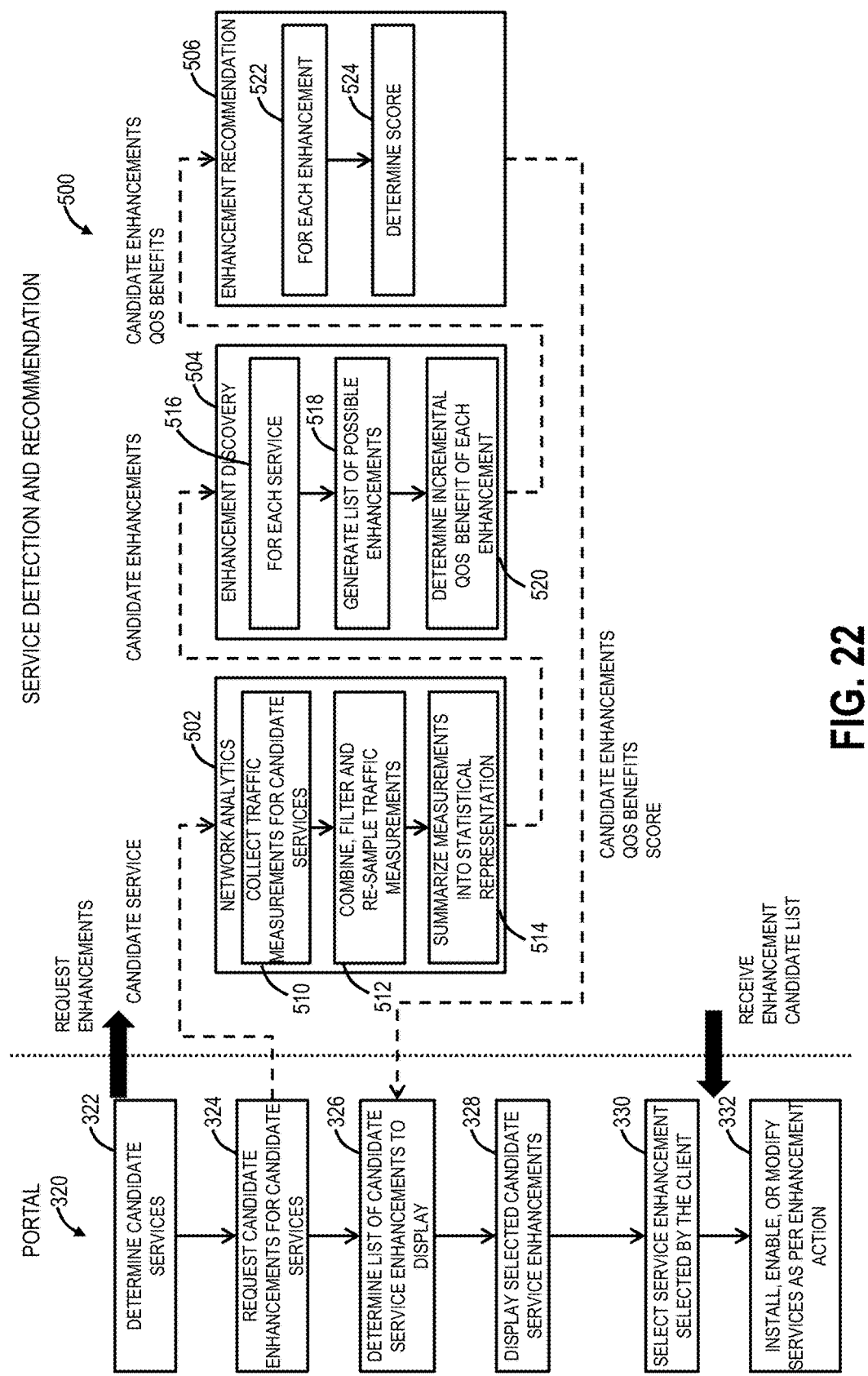
FIG. 22 is a flow diagram of a service enhancement detection and recommendation process with the service portal in the SDN network of FIG. 1.

Referring to FIG. 22, in an exemplary embodiment, a flow diagram illustrates a service enhancement detection and recommendation process 500 with the portal 26. Specifically, FIG. 22 maps activity in the service enhancement identification process 320 for the service portal 26 with the process 500 implemented in the SDN network 10 for service enhancement detection and recommendations. The process 500 can include three stages—network analytics 502, enhancement discovery 504, and enhancement recommendation 506. The network analytics 502 is started responsive to the step 324 and include collecting traffic measurements for candidate services (step 510); combining, filtering, and re-sampling traffic measurements (step 512), and summarizing the measurements into statistical representations (step 514). The enhancement discovery 504 includes, for each service (step 516), generating a list of possible enhancements (step 518) and determining the incremental QoS benefit of each enhancement (step 520). The enhancement recommendation 506 includes, for each enhancement (step 522), determining a score (step 524).

Figure 23:
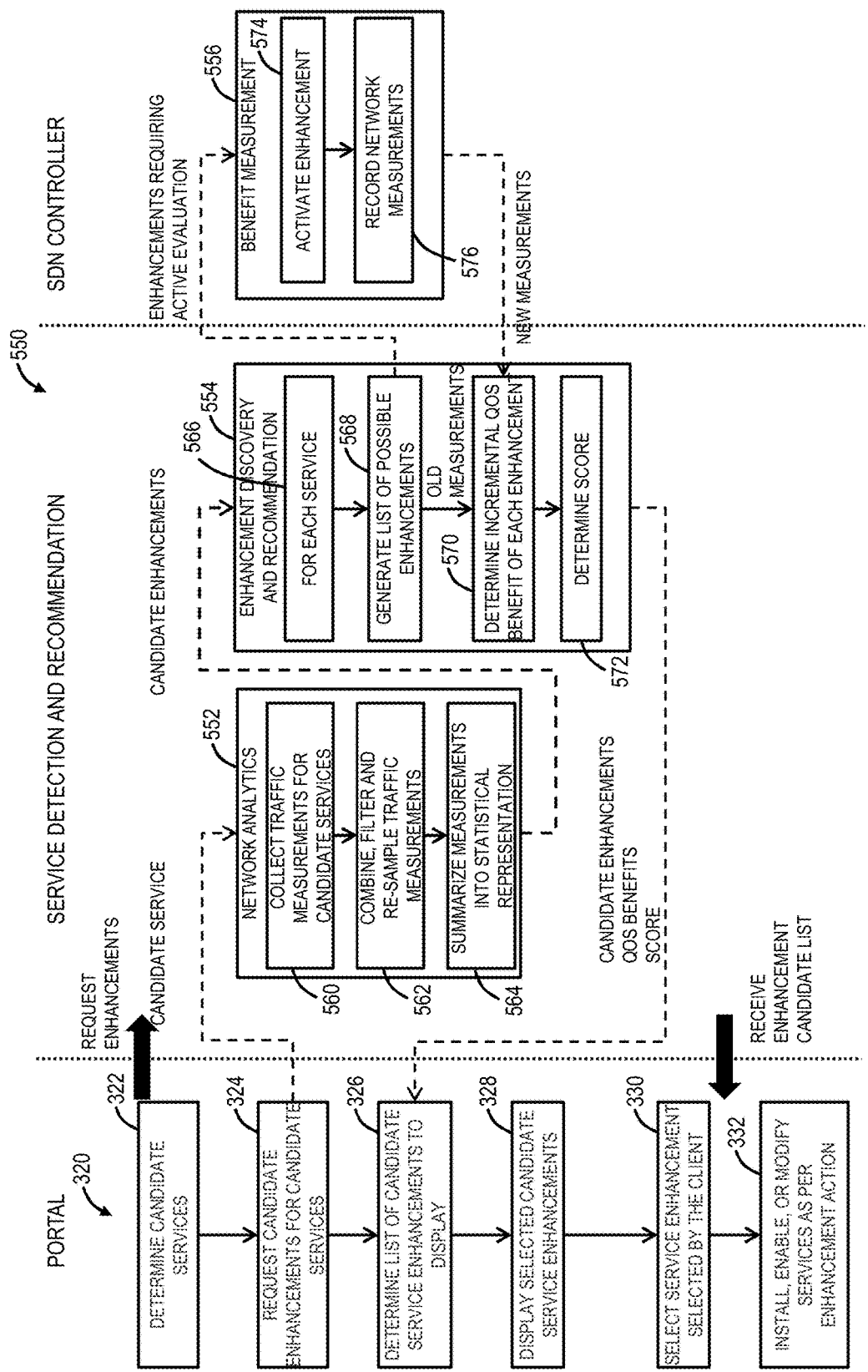
FIG. 23 is a flow diagram of a service enhancement detection and recommendation process with the service portal in the SDN network of FIG. 1, which can include active evaluation.

Service Enhancement Detection and Recommendation with Portal—with Active Evaluation Referring to FIG. 23, in an exemplary embodiment, a flow diagram illustrates a service enhancement detection and recommendation process 550 with the portal 26, which can include active evaluation. Specifically, FIG. 23 maps activity in the service enhancement identification process 320 for the service portal 26 with the process 550 implemented in the SDN network 10 for service enhancement detection and recommendations. The process 550 can include three stages—network analytics 552, candidate enhancements 554, and enhancements requiring active evaluation 556. The network analytics 552 is started responsive to the step 324 and include collecting traffic measurements for candidate services (step 560); combining, filtering, and re-sampling traffic measurements (step 562), and summarizing the measurements into statistical representations (step 564).

The candidate enhancements 554 can include, for each service (step 566), generating a list of possible enhancements (step 568), determining the incremental QoS benefit of each enhancement with old measurements (step 570), and determining the score (step 572). The enhancements requiring active evaluation 556 can be implemented after the step 568 to get actual measurements. The enhancements requiring active evaluation 556 include activating the enhancement (step 574) and recording network measurements (step 576) which are provided to the step 570.

Exemplary Server

Figure 24:
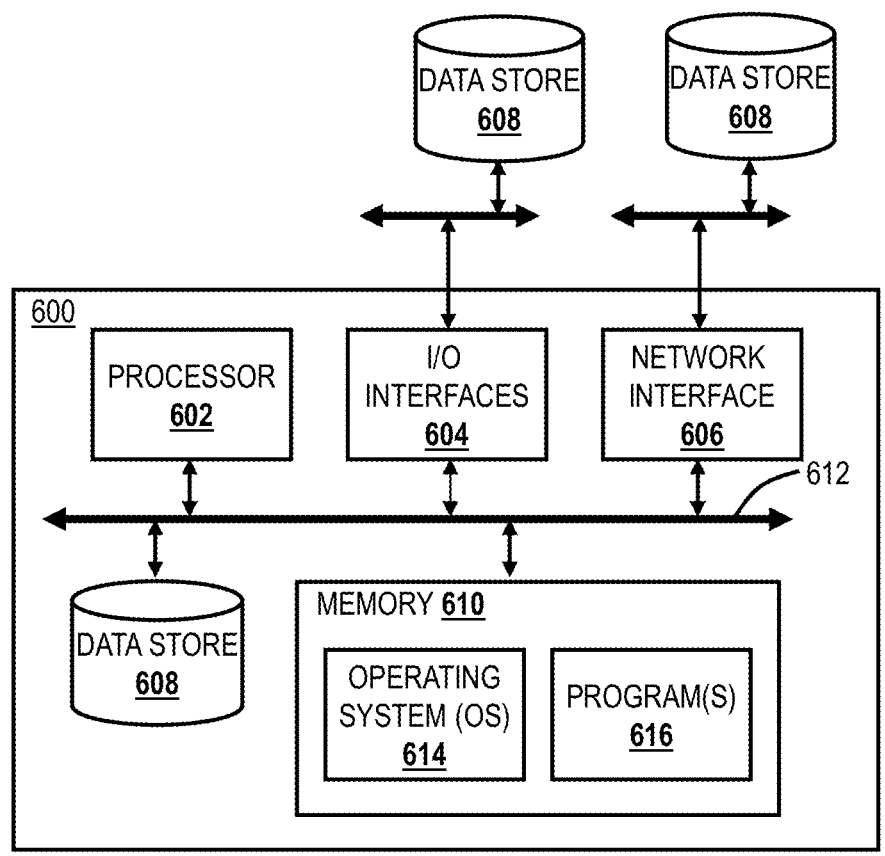
FIG. 24 is a block diagram of a server such as for the implementing various components of the SDN network, the SDN control plane, the SDN operating environment, and the various processes described herein.

Referring to FIG. 24, in an exemplary embodiment, a block diagram illustrates a server 600 such as for the implementing various components of the SDN network 10, the SDN control plane 20, the SDN environment 100, and the various processes described herein. The server 600 can be a digital computer that, in terms of hardware architecture, generally includes a processor 602, input/output (I/O) interfaces 604, a network interface 606, a data store 608, and memory 610. It should be appreciated by those of ordinary skill in the art that FIG. 24 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the components above.

The processor 602 is a hardware device for executing software instructions. The processor 602 can be any custom made or commercially available processor, a central processing unit (CPU), an auxiliary processor among several processors associated with the server 600, a semiconductor based microprocessor (in the form of a microchip or chip set), or generally any device for executing software instructions. When the server 600 is in operation, the processor 602 is configured to execute software stored within the memory 610, to communicate data to and from the memory 610, and to generally control operations of the server 600 pursuant to the software instructions. The I/O interfaces 604 can be used to receive user input from and/or for providing system output to one or more devices or components. User input can be provided via, for example, a keyboard, touchpad, and/or a mouse. System output can be provided via a display device and a printer (not shown). I/O interfaces 604 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 606 can be used to enable the server 600 to communicate on a network. The network interface 606 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 606 can include address, control, and/or data connections to enable appropriate communications on the network. A data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. In one example, the data store 608 can be located internal to the server 600 such as, for example, an internal hard drive connected to the local interface 612 in the server 600. Additionally in another embodiment, the data store 608 can be located external to the server 600 such as, for example, an external hard drive connected to the I/O interfaces 604 (e.g., SCSI or USB connection). In a further embodiment, the data store 608 can be connected to the server 600 through a network, such as, for example, a network-attached file server.

The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the approaches above may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

CONCLUSION

The systems and methods take advantage of the fact that, due to its global view of the network, SDN enables deeper understanding of network dynamics and customer behavior. This is utilized to improve QoS/QoE with network analytic. The global view of the network allows a deeper understanding of what the network clients may need to run their traffic more efficiently or with a higher QoS or QoE. Thus, the systems and methods take advantage of this new information to improve services simultaneously and increase operator profits. A significant aspect of the systems and methods includes using network analytics to determine which network services can be enhanced by modifying their bandwidth, priority, or path and when that modification should be implemented. The systems and methods produce a ranked list of network services sorted by their score, where the score represents an improvement that may be implemented by changing the bandwidth, priority or the path of service at specific future time points. A unique aspect is the fact that past network measurements are used to forecast traffic volumes and then the forecast is used to determine how much benefit a specific service enhancement may offer at forecast times. Another unique aspect is that the systems and methods may include a user portal, where the scoring mechanism is used to choose which enhancements could be shown to the user of the network, or as a part of a network operator portal where the scoring and the cost-benefit analysis can be used to select which enhancements are offered to network clients.

Yet another unique aspect is determining which VNFs should be used by which client or traffic stream. The systems and methods produce a ranked list of VNFs sorted by their score, where the score represents an improvement that may result from using a VNF. A unique aspect of the approach is the collection of DPI or other network measurements (on-demand if necessary) and calculating or measuring the incremental benefit of a specific VNF. This benefit is then translated into a score, which can be based on user specific policy. Another unique aspect includes allowing various virtual appliance makers to produce their own benefits analysis based on the same set of measurements, which can be ranked by a scoring policy common to all virtual appliance makers.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby and are intended to be covered by the following claims.

What is claimed is:

1. A method for service enhancement discovery in a Software Defined Networking (SDN) network, the method comprising:
obtaining network measurements for one or more candidate services in the network;
utilizing the network measurements to determine one or more service enhancements for the one or more candidate services, wherein the one or more service enhancements provide additional network functionality to the one or more candidate services;
determining a cost and a benefit for each of the service enhancements for the one or more candidate services;
providing the service enhancements for the one or more candidate services based on scoring using associated cost and associated benefit of each of the service enhancements,
wherein the cost is determined based on a cost of adding the service enhancement in the network and the benefit is determined based on increments to one of Quality of Service (QoS) and Quality of Experience (QoE) for the one or more candidate services; and
implementing one or more of the provided service enhancements in the network using a control plane.

2. The method of claim 1, wherein determining the service enhancements for an active service of the one or more candidate services comprises determining one or more future times at which the active service is enhanced by changing at least one of its bandwidth, path, and packet priority.

3. The method of claim 1, wherein the service enhancements for an active service of the one or more candidate services comprise one or more Virtual Network Functions (VNFs) that enhance the active service.

4. The method of claim 1, wherein the network measurements comprise historical measurements and on-demand measurements, wherein the on-demand measurements are selectively performed on the service enhancements.

5. The method of claim 1, wherein the increments to one of QoS and QoE is based on one or more of lower required bandwidth, lower packet loss, higher throughput, and faster application response time.

6. The method of claim 1, wherein the service enhancements for an active service of the one or more candidates services comprise one or more Virtual Network Functions (VNFs) which are configured to enhance the active service, and where network measurements comprise historical measurements and on-demand measurements, wherein the on-demand measurements are selectively performed with the one or more VNFs on the active service.

7. The method of claim 6, wherein the one or more VNFs comprise a plurality of VNFs with at least two of the plurality of VNFs being different types.

8. A system configured to perform service enhancement discovery in a Software Defined Networking (SDN) network, the system comprising:
a network interface communicatively coupled to the network;
a processor communicatively coupled to the network interface;
memory storing instructions that, when executed, cause the processor to
obtain network measurements from the network for one or more candidate services in the network,
utilize the network measurements to determine one or more service enhancements for the one or more candidate services, wherein the one or more service enhancements provide additional network functionality to the one or more candidate services,
determine a cost and a benefit for each of the service enhancements for the one or more candidate services, and
provide the service enhancements for the one or more candidate services based on scoring using associated cost and associated benefit of each of the service enhancements,
wherein the cost is determined based on a cost of adding the service enhancement in the network and the benefit is determined based on increments to one of Quality of Service (QoS) and Quality of Experience (QoE) for the one or more candidate services; and
a control plane operable for implementing one or more of the provided service enhancements in the network.

9. The system of claim 8, wherein the service enhancements are determined for an active service of the one or more candidate services through determining one or more future times at which the active service is enhanced by changing at least one of its bandwidth, path, and packet priority.

10. The system of claim 8, wherein the service enhancements for an active service of the one or more candidate services comprise one or more Virtual Network Functions (VNFs) that enhance the active service.

11. The system of claim 8, wherein the network measurements comprise historical measurements and on-demand measurements, wherein the on-demand measurements are selectively performed on the service enhancements.

12. The system of claim 8, wherein the increments to one of QoS and QoE is based on one or more of lower required bandwidth, lower packet loss, higher throughput, and faster application response time.

13. The system of claim 8, wherein the service enhancements for an active service of the one or more candidates services comprise one or more Virtual Network Functions (VNFs) which are configured to enhance the active service, and where network measurements comprise historical measurements and on-demand measurements, wherein the on-demand measurements are selectively performed with the one or more VNFs on the active service.

14. The system of claim 13, wherein the one or more VNFs comprise a plurality of VNFs with at least two of the plurality of VNFs being different types.

15. A Software Defined Networking (SDN) network with a discovery engine configured to perform service enhancement discovery in the network, the network comprising:
- a plurality of interconnected network elements;
- a controller configured to implement a control plane, wherein the controller is communicatively coupled to one or more of the plurality of interconnected network elements; and
- a server communicatively coupled to the controller and implementing a discovery engine configured to
  - obtain network measurements from the network for one or more candidate services in the network,
  - utilize the network measurements to determine one or more service enhancements for the one or more candidate services, wherein the one or more service enhancements provide additional network functionality to the one or more candidate services,
  - determine a cost and a benefit for each of the service enhancements for the one or more candidate services, and
  - provide the service enhancements for the one or more candidate services based on scoring using associated cost and associated benefit of each of the service enhancements,
  - wherein the cost is determined based on a cost of adding the service enhancement in the network and the benefit is determined based on increments to one of Quality of Service (QoS) and Quality of Experience (QoE) for the one or more candidate services;
  - wherein the control plane is operable for implementing one or more of the provided service enhancements in the network.

16. The network of claim 15, wherein the service enhancements are determined for an active service of the one or more candidate services through determining one or more future times at which the active service is enhanced by changing at least one of its bandwidth, path, and packet priority.

17. The network of claim 15, wherein the service enhancements for an active service of the one or more candidate services comprise one or more Virtual Network Functions (VNFs) that enhance the active service.

18. The network of claim 15, wherein the network measurements comprise historical measurements and on-demand measurements, wherein the on-demand measurements are selectively performed on the service enhancements.

* * * * *